US009951816B2

(12) United States Patent
Sato et al.

(10) Patent No.: US 9,951,816 B2
(45) Date of Patent: Apr. 24, 2018

(54) BEARING PART, ROLLING BEARING, AND METHOD FOR MANUFACTURING BEARING PART

(71) Applicants: Daisuke Sato, Kuwana (JP); Chikara Ohki, Kuwana (JP)

(72) Inventors: Daisuke Sato, Kuwana (JP); Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 2 days.

(21) Appl. No.: 14/436,761

(22) PCT Filed: Oct. 16, 2013

(86) PCT No.: PCT/JP2013/078071
§ 371 (c)(1),
(2) Date: Apr. 17, 2015

(87) PCT Pub. No.: WO2014/061699
PCT Pub. Date: Apr. 24, 2014

(65) Prior Publication Data
US 2016/0178009 A1 Jun. 23, 2016

(30) Foreign Application Priority Data

Oct. 17, 2012 (JP) .................................. 2012-229988
Feb. 13, 2013 (JP) .................................. 2013-025463

(51) Int. Cl.
*F16C 33/62* (2006.01)
*C21D 9/40* (2006.01)
(Continued)

(52) U.S. Cl.
CPC ................ *F16C 33/62* (2013.01); *C21D 1/06* (2013.01); *C21D 9/36* (2013.01); *C21D 9/40* (2013.01);
(Continued)

(58) Field of Classification Search
USPC .......... 148/219; 428/336, 469, 472; 384/492
See application file for complete search history.

(56) References Cited

U.S. PATENT DOCUMENTS 5,456,766 A * 10/1995 Beswick .................. C21D 1/78
148/216
6,413,328 B2 * 7/2002 Takayama ................ C23C 8/28
148/319
(Continued)

FOREIGN PATENT DOCUMENTS

CN 1934282 A 3/2007
CN 101087896 A 12/2007
(Continued)

OTHER PUBLICATIONS

Ohki "Atmospheric Control method for JIS-SUJ2 carbonitriding processes" NTN Technical Review No. 74 p. 44-53.*
(Continued)

*Primary Examiner* — Archene Turner
(74) *Attorney, Agent, or Firm* — McDermott Will & Emery LLP

(57) ABSTRACT

An outer ring, an inner ring, and a ball each serving as a bearing part is made of a steel containing 0.95 mass % or more and 1.10 mass % or less of carbon, 0.05 mass % or more and less than 0.3 mass % of silicon, 0.10 mass % or more and 0.50 mass % or less of manganese, and 1.30 mass % or more and 2.00 mass % or less of chromium, with the rest made up of iron and an impurity. A surface layer region defined as a region extending to a depth of not more than 20 μm from an outer ring raceway surface, an inner ring raceway surface, and a ball rolling surface, which are each a surface where the bearing part is in rolling contact with another part, has an average nitrogen concentration of 0.2 mass % or more and 0.7 mass % or less. Five or more carbides with a diameter of 0.5 μm or less are present per 100 μm² in the surface layer region.

13 Claims, 21 Drawing Sheets

(51) Int. Cl.
| | |
|---|---|
| C23C 8/32 | (2006.01) |
| C23C 8/80 | (2006.01) |
| C21D 1/06 | (2006.01) |
| C22C 38/00 | (2006.01) |
| C22C 38/18 | (2006.01) |
| F16C 33/64 | (2006.01) |
| C22C 38/02 | (2006.01) |
| C22C 38/04 | (2006.01) |
| F16C 33/32 | (2006.01) |
| F16C 33/34 | (2006.01) |
| C21D 9/36 | (2006.01) |
| C23F 17/00 | (2006.01) |
| C21D 1/76 | (2006.01) |
| F16C 19/06 | (2006.01) |
| F16C 19/30 | (2006.01) |
| F16C 19/36 | (2006.01) |

(52) U.S. Cl.
CPC ............. *C22C 38/00* (2013.01); *C22C 38/02* (2013.01); *C22C 38/04* (2013.01); *C22C 38/18* (2013.01); *C23C 8/32* (2013.01); *C23C 8/80* (2013.01); *C23F 17/00* (2013.01); *F16C 33/32* (2013.01); *F16C 33/34* (2013.01); *F16C 33/64* (2013.01); *C21D 1/76* (2013.01); *F16C 19/06* (2013.01); *F16C 19/30* (2013.01); *F16C 19/364* (2013.01); *F16C 2202/04* (2013.01); *F16C 2204/66* (2013.01); *F16C 2204/70* (2013.01); *F16C 2223/16* (2013.01); *F16C 2240/60* (2013.01)

(56) References Cited

U.S. PATENT DOCUMENTS

| | | |
|---|---|---|
| 2007/0151634 A1 | 7/2007 | Fujita |
| 2007/0169850 A1* | 7/2007 | Ohki .................. C21D 9/40 148/219 |
| 2008/0047633 A1 | 2/2008 | Kizawa et al. |
| 2010/0154937 A1* | 6/2010 | Ohki .................. C21D 1/06 148/218 |
| 2013/0019666 A1 | 1/2013 | Ohki |

FOREIGN PATENT DOCUMENTS

| | | |
|---|---|---|
| EP | 0 626 468 A1 | 11/1994 |
| EP | 0 718 513 * | 6/1996 |
| JP | 5-118336 A | 5/1993 |
| JP | 2005-195148 * | 7/2005 |
| JP | 3700044 B2 | 9/2005 |
| JP | 2007-046114 * | 2/2007 |
| JP | 3976221 B2 | 9/2007 |
| JP | 2007-277648 A | 10/2007 |
| JP | 2012-31456 A | 2/2012 |
| WO | 2007/116875 A1 | 10/2007 |
| WO | 2011/122632 A1 | 10/2011 |

OTHER PUBLICATIONS

First Office Action Chinese Patent Application No. 201380053951.9 dated May 10, 2016 with English translation.

Chikara Ohki, "Evaluation of Scratched Contact Fatigue Life with Artificial Dent of Carbonitrided SUJ2 Steel Whose Surface Nitrogen Content is Controlled", NTN Technical Review No. 78, (2010), 9 pages.

English Translation International Search Report PCT/JP2013/078071 dated Jan. 7, 2014.

Chikara Ohki, "Estimation of Nitrogen Concentration Distribution for Carbonitrided SUJ2 Steel", Journal of the Iron & Steel Institute of Japan, Mar. 1, 2007, vol. 93, No. 3, pp. 220-227—with English synopsis.

Chikara Ohki, "Evaluation of scratched contact fatigue life with artificial dent of carbonitrided SUJ2 steel whose surface nitrogen content is controlled", NTN Technical Review, 2010, No. 78, pp. 20-28 with English synopsis.

Supplementary European Search Report EP Application No. 13846585.1 dated Aug. 17, 2016.

* cited by examiner

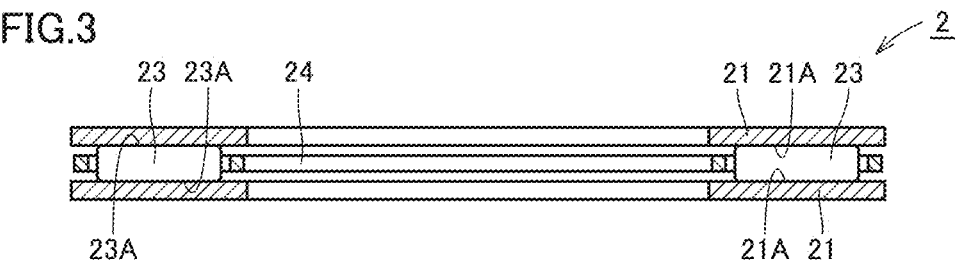
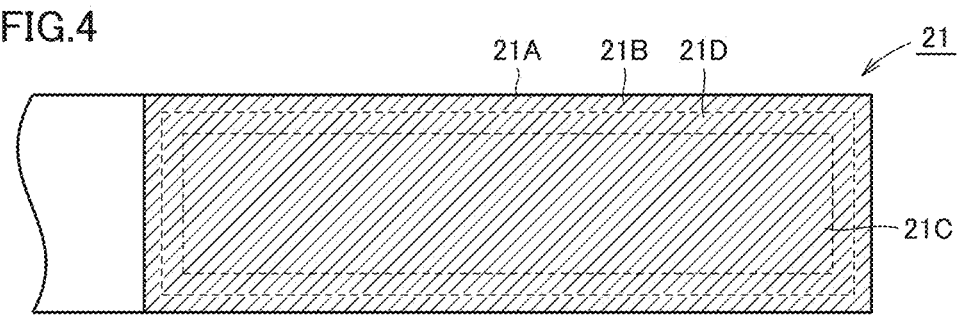
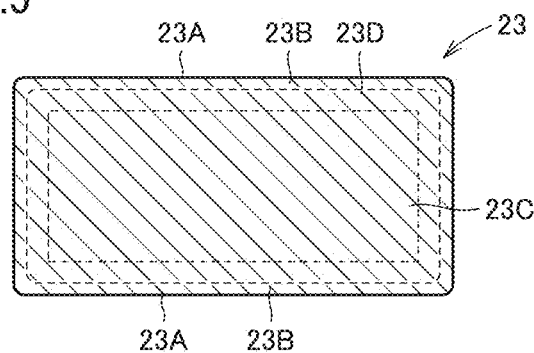

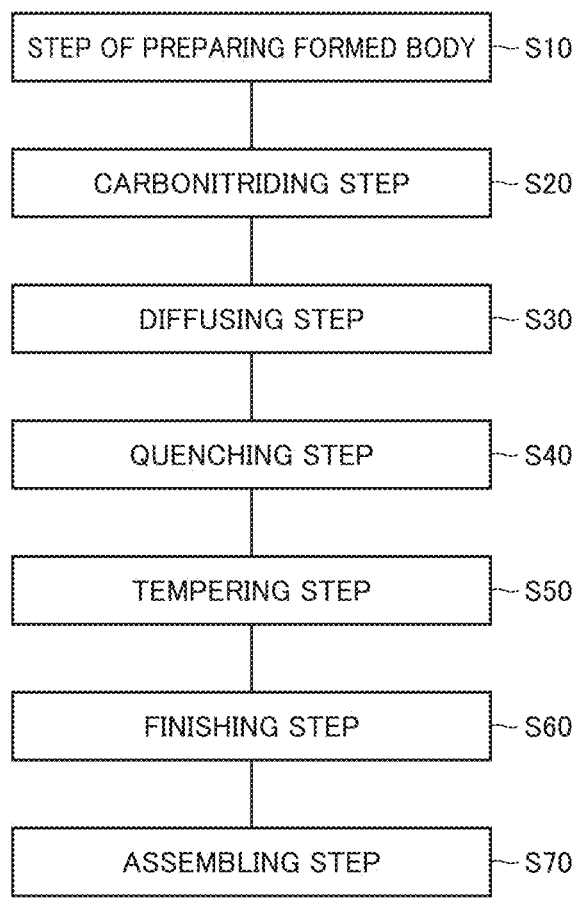

BEARING PART, ROLLING BEARING, AND METHOD FOR MANUFACTURING BEARING PART

CROSS REFERENCE TO RELATED APPLICATIONS

This application is the U.S. National Phase of PCT/JP2013/078071 filed Oct. 16, 2013, which claims priority from Japanese Patent Application No. 2012-229988 filed Oct. 17, 2012, and Japanese Patent Application No. 2013-025463 filed Feb. 13, 2013. The subject matter of each is incorporated herein by reference in entirety.

TECHNICAL FIELD

The present invention relates to a bearing part, a rolling bearing, and a method of manufacturing a bearing part, and more specifically to a bearing part, a rolling bearing, and a method of manufacturing a bearing part that can ensure a high durability even in a harsh usage environment in which they are used.

BACKGROUND ART

As a measure to improve the durability of a bearing part, a carbonitriding process of introducing carbon and nitrogen into a surface layer portion of a bearing part prior to quenching is known (see for example Japanese Patent Laying-Open Nos. 5-118336 (PTD 1) and 2012-31456 (PTD 2)). This carbonitriding process is known to improve the rolling fatigue life of a rolling bearing, particularly the life of the rolling bearing in an environment in which hard foreign matters intrude into the rolling bearing (foreign-matters intrusion environment). The carbonitriding process is a process in which a bearing part made of a steel is heated to a temperature range of the $A_1$ transformation temperature or more in an atmosphere containing ammonia, carbon monoxide, carbon dioxide, and hydrogen, to thereby introduce carbon in a surface layer portion of the bearing part, or introduce nitrogen in the surface layer portion while suppressing decarburization of the surface layer portion.

Regarding this carbonitriding process, it is proposed to adjust $a_c^*$ defined by the following formula (1) and adjust $\alpha$ defined by the following formula (2) to thereby keep the carbon concentration in the surface layer portion at an appropriate level and improve the rate at which nitrogen is introduced, and accordingly enhance the efficiency of the carbonitriding process (see for example Japanese Patent Laying-Open No. 2007-277648 (PTD 3)).

$$a_c^* = \frac{(Pco)^2}{K \times Pco_2} \quad (1)$$

Pco: partial pressure (atm) of carbon monoxide
Pco$_2$: partial pressure (atm) of carbon dioxide
K: <C>+CO$_2$⇔ equilibrium constant of 2CO $$\alpha = \frac{P_N}{0.006 \times (P_H)^{\frac{3}{2}}} \times \frac{(1.877 - 1.055 \times a_c^*)}{100} \quad (2)$$

CITATION LIST

Patent Document

PTD 1: Japanese Patent Laying-Open No. 5-118336
PTD 2: Japanese Patent Laying-Open No. 2012-31456
PTD 3: Japanese Patent Laying-Open No. 2007-277648

SUMMARY OF INVENTION

Technical Problem

There remains, however, a problem that the durability may be inadequate depending on the usage environment, even in the case where the carbonitriding process is applied to the bearing part. Further, the use of the carbonitriding process may cause a problem that the rate of secular dimensional change increases to deteriorate the dimensional stability of the bearing part.

The present invention has been made to solve the above-described problems, and an object of the present invention is to provide a bearing part, a rolling bearing, and a method of manufacturing a bearing part that can ensure a high durability even in a harsh usage environment. Another object of the present invention is to provide a bearing part that can achieve both an improved durability and an improved dimensional stability.

Solution to Problem

According to the present invention, a bearing part is made of a steel containing 0.95 mass % or more and 1.10 mass % or less of carbon, 0.05 mass % or more and less than 0.3 mass % of silicon, 0.10 mass % or more and 0.50 mass % or less of manganese, and 1.30 mass % or more and 2.00 mass % or less of chromium, with the rest made up of iron and an impurity, a surface layer region defined as a region extending to a depth of not more than 20 μm from a contact surface where the bearing part is in rolling contact with another part has an average nitrogen concentration of 0.2 mass % or more and 0.7 mass % or less, and five or more carbides (including carbonitrides) with a diameter of 0.5 μm or less are present per 100 μm$^2$ in the surface layer region.

The inventors of the present invention have closely studied the cause of the phenomenon that a bearing part has an inadequate durability even in the case where a carbonitriding process is applied to the bearing part. Consequently, they have made the following findings to thereby achieve the present invention.

When a condition is created where five or more carbides having a diameter of 0.5 μm or less are present per 100 μm$^2$ in a surface layer region (a region extending to a depth of not more than 20 μm from a contact surface) of a bearing part, precipitation strengthening of the carbides improve the static load capacity of the bearing part. Here, a condition where five or more carbides having a diameter of 0.5 μm or less are present per 100 μm$^2$ in the surface layer region refers to a condition where five or more carbides having a diameter of 0.5 μm or less are confirmed per 100 μm$^2$ in the surface layer region, when the bearing part is cut along a plane perpendicular to the contact surface of the bearing part and the surface layer region of the resultant cross section is observed with a microscope. Further, the average nitrogen concentration of the surface layer region that is set to 0.2 mass % or more sufficiently improves the durability (life) of the bearing part in a foreign-matters intrusion environment and the durability of the bearing part in a detergent-oil lubrication environment.

In the case, however, where nitrogen is introduced into a steel containing a relatively large amount of chromium like the aforementioned steel, the solid solubility limit of carbon increases in the region where nitrogen is introduced. As a result, carbides decrease, or may disappear depending on the case. If the nitrogen concentration in the surface layer region is higher than 0.7 mass %, the quenchability of the surface layer region deteriorates, which is likely to cause an incompletely quenched structure to be formed. In order to solve this problem, it is effective to perform a diffusing process after the carbonitriding process. If, however, the diffusing process is performed without taking measures at all, nitrogen is separated from the surface layer region and accordingly the nitrogen concentration decreases. Then, regardless of the fact that a nitrogen-rich layer where the nitrogen concentration is higher than the inner portion is formed near the surface of the bearing part, the nitrogen concentration in the surface layer region, which has a great influence on the durability, is inadequate. It has become evident that this is an impediment to the improvement in durability of the bearing part. Namely, in the case where a nitrogen-rich layer is formed through a carbonitriding process of the bearing part, an excessive amount of nitrogen causes the incompletely quenched structure to be formed, or causes the carbides to be reduced or to disappear. In the case where the diffusing process eliminates the issue of the excessive amount of nitrogen, the nitrogen concentration in the surface layer region is inadequate regardless of the fact that the nitrogen-rich layer is formed. The inventors of the present invention have found that the above-described phenomenon impedes the improvement in durability of the bearing part, then overcome this, and thereby improved the durability of the bearing part.

In the bearing part of the present invention, five or more carbides with a diameter of 0.5 µm or less are present per 100 µm$^2$ in a surface layer region (a region extending to a depth of not more than 20 µm from a contact surface where the bearing part is in rolling contact with another part), and accordingly the static load capacity of the bearing part is adequately ensured. The surface layer region has an average nitrogen concentration of 0.2 mass % or more and 0.7 mass % or less, and accordingly both the improvement in durability by introduction of nitrogen and the avoidance of formation of an incompletely quenched structure due to introduction of nitrogen are achieved. The nitrogen introduced into the surface layer region can be prevented from being separated from the surface to thereby achieve the above-described features. As seen from the above, the bearing part of the present invention can ensure a high durability even in a harsh usage environment. It should be noted that "contact surface" means a raceway surface of a race member such as race, or a rolling surface of a rolling element such as ball or roller (the surface of a ball, the outer peripheral surface of a roller).

Here, a description will be given of the reason why the ratio of each component in the steel forming the bearing part is set to the aforementioned range.

Carbon: 0.95 Mass % or More and 1.10 Mass % or Less

The carbon content has a significant influence on the hardness and the carbide amount of the bearing part after quench-hardening. The carbon content in the steel can be set to 0.95 mass % or more to thereby achieve an adequate hardness and an adequate carbide amount, without introducing a large amount of carbon into steel through heat treatment. In contrast, a carbon content of more than 1.10 mass % causes a large-sized carbide to be formed when the steel is produced, which may have an adverse influence on the durability of the bearing part. In view of this, the carbon content is set to 0.95 mass % or more and 1.10 mass % or less.

Silicon: 0.05 Mass % or More and Less than 0.3 Mass %

Silicon contributes to the improvement in tempering softening resistance of the steel. If the silicon content is less than 0.05 mass %, the tempering softening resistance is inadequate. In this case, tempering after quench-hardening or a temperature increase during use of the bearing part may cause the hardness of the contact surface to decrease to an unallowable extent. In contrast, if the silicon content is 0.3 mass % or more, the hardness of the material before being quenched is higher, leading to a lower workability in cold working for forming the material into the bearing part. In view of this, the silicon content is set to 0.05 mass % or more and less than 0.3 mass %. It should be noted that silicon promotes hydrogen embrittlement peeling of the bearing part. The lower limit of the silicon content is therefore set lower than that of SUJ2 defined by the JIS standards that is the most common bearing steel. Namely, in the case where suppression of the hydrogen embrittlement peeling is given a higher priority, the silicon content may be less than 0.15 mass % which is lower than that of SUJ2.

Manganese: 0.10 Mass % or More and 0.50 Mass % or Less

Manganese contributes to the improvement in quenchability of the steel. If the manganese content is less than 0.10 mass %, this effect cannot adequately be achieved. In contrast, if the manganese content is more than 0.50 mass %, the hardness of the material before being quenched is higher, leading to deterioration in workability in cold working. In view of this, the manganese content is set to 0.10 mass % or more and 0.50 mass % or less.

Chromium: 1.30 Mass % or More and 2.00 Mass % or Less

Chromium contributes to the improvement in quenchability of the steel and the improvement in rolling fatigue life of the bearing part. If the chromium content is less than 1.30 mass %, this effect cannot adequately be achieved. In contrast, if the chromium content is more than 2.00 mass %, a problem of a higher material cost arises. In view of this, the chromium content is set to 1.30 mass % or more and 2.00 mass % or less. It should be noted that if the silicon content is reduced for addressing the hydrogen embrittlement peeling, the quenchability of the steel may be inadequate. The inadequate quenchability can be compensated for by an increase of the amount of chromium. The upper limit of the chromium content is therefore set higher than that of the SUJ2 defined by the JIS standards that is the most common bearing steel. Particularly in the case where suppression of the hydrogen embrittlement peeling is given a higher priority and the silicon content is set to less than 0.15 mass % which is lower than that of SUJ2, the chromium content may be set higher than 1.60 mass % which is higher than that of SUJ2.

In the bearing part, preferably the average nitrogen concentration is 0.7 mass % or less across the whole region extending to a depth of not more than 20 µm from a surface.

Accordingly, formation of an incompletely quenched structure is suppressed not only in the contact surface of the bearing part but also in a region other than the contact surface such as a recessed portion for example which will not be ground after the nitrogen-rich layer is formed.

In the bearing part, preferably the contact surface has a hardness of 700 HV or more. Accordingly, even a bearing part used in a harsh embodiment can be given an adequate static load capacity.

In the bearing part, preferably the contact surface has retained austenite of an amount of 20 vol % or more and 35 vol % or less. Accordingly, the durability of the bearing part in a foreign-matters intrusion environment can be improved while an adequate hardness of the contact surface is maintained.

In the bearing part, preferably an average amount of retained austenite in the whole bearing part is 18 vol % or less. Accordingly, the improvement in dimensional stability (suppression of a secular dimensional change) of the bearing part can be achieved.

In the bearing part, preferably a difference between a maximum value and a minimum value of a hardness of the bearing part is 130 HV or more, which is determined from a hardness distribution measured in a depth direction in a cross section perpendicular to the contact surface, after the bearing part is kept at 500° C. for an hour. In such a bearing part, introduction of nitrogen of an adequate concentration is ensured.

In the bearing part, preferably a carbonitrided layer is formed in the surface layer region. In addition, an area ratio of a precipitate in a region where the carbonitrided layer is not formed is preferably 7% or less.

The steel which forms the bearing part can be solid-solution-strengthened by dissolution of a precipitate such as carbide in the steel. Here, the area ratio of the carbide in the steel before quenched is constant, and therefore, the amount of carbon which is solid-dissolved in the steel can be estimated from the area ratio of the carbide in the bearing part after the carbonitriding process. According to the study by the inventors of the present invention, the area ratio of the precipitate in the bearing part that is an area where the carbonitrided layer is not formed can be set to 7% or less to thereby increase the amount of carbon solid-dissolved therein, which significantly increases the life. This area ratio of the precipitate can be achieved by increasing the process temperature of the carbonitriding process.

In the bearing part, preferably a precipitate is present in a surface other than the contact surface. In the case where the precipitate is present in a surface other than the contact surface, the carbon concentration in the region other than the surface layer region has reached the solid solubility limit concentration, and the life is thus improved. Accordingly, the bearing part having a further improved durability can be provided.

In the bearing part, preferably the surface layer region may be nitrided by undergoing a carbonitriding process performed so that $a_c^*$ defined by a formula (1) is 0.88 or more and 1.27 or less and α defined by a formula (2) is 0.012 or more and 0.020 or less:

$$a_c^* = \frac{(Pco)^2}{K \times Pco_2} \qquad (1)$$

where

Pco: a partial pressure (atm) of carbon monoxide, $Pco_2$: a partial pressure (atm) of carbon dioxide, and K: <C>+$CO_2$⇔equilibrium constant of 2CO, $$\alpha = \frac{P_N}{0.006 \times (P_H)^{\frac{3}{2}}} \times \frac{(1.877 - 1.055 \times a_c^*)}{100} \qquad (2)$$

where $P_N$ is a partial pressure of undecomposed ammonia and $P_H$ is a partial pressure of hydrogen.

According to the study by the inventors of the present invention, on the condition that the value of α is 0.012 or less, the amount of nitrogen introduced into the steel by the carbonitriding process within a predetermined time increases at a substantially constant rate as the value of α increases. On the condition that the value of α is more than 0.012, the rate of increase of the amount of introduced nitrogen is smaller. Therefore, the value of α can be set to 0.012 or more to thereby allow nitrogen to be introduced efficiently into the steel in the carbonitriding process. In contrast, if the value of α is more than 0.020, the amount of nitrogen introduced within a predetermined time reaches saturation and sooting (a phenomenon that soot generated in a heat treatment furnace attaches to a work to be treated) is likely to occur, which may cause disadvantages in terms of quality such as surface carburization of the work to be treated. The value of α is therefore preferably 0.020 or less and more preferably 0.018 or less.

Further, the value of $a_c^*$ is preferably 0.88 or more, in order to prevent decarburization of the surface layer portion of the steel. In contrast, if the value of $a_c^*$ is more than 1.27, an excessively large carbide (cementite: $Fe_3C$) is formed in the surface layer portion of the steel, which may adversely influence the characteristics of the steel. The value of $a_c^*$ is therefore preferably 1.27 or less. Moreover, if the value of $a_c^*$ is more than 1.00, sooting may occur and the steel is over-carburized. In order to particularly prevent over-carburization, the value of $a_c^*$ is preferably 1.00 or less. Thus, the carbonitriding process performed in an atmosphere where α is 0.012 or more and 0.020 or less and $a_c^*$ is 0.88 or more and 1.27 or less will allow the carbon concentration in the surface layer portion of the bearing part to be kept at an appropriate level and allow the carbonitriding process to be performed efficiently. Accordingly, the manufacturing cost of the bearing part can be reduced.

In the bearing part, preferably the surface layer region is nitrided by undergoing a carbonitriding process performed at a temperature of 820° C. or more and 900° C. or less. It is also preferable for the bearing part that after the carbonitriding process, a tempering process may be performed at a temperature of 170° C. or more and 220° C. or less.

The aforementioned heat treatment conditions are appropriate as conditions for setting the area ratio of a precipitate in a region other than the surface layer region, the amount of retained austenite in the contact surface, and the average amount of retained austenite in the whole bearing part, within the respective ranges mentioned above.

According to the present invention, a rolling bearing includes: a race member; and a rolling element arranged in contact with the race member. At least one of the race member and the rolling element is the above-described bearing part. The rolling bearing of the present invention includes, as at least one of the race member and the rolling element, the bearing part that can ensure a high durability even in a harsh usage environment, and thus the rolling bearing has a high durability.

According to the present invention, a method of manufacturing a bearing part includes the steps of: preparing a formed body made of a steel containing 0.95 mass % or more and 1.10 mass % or less of carbon, 0.05 mass % or more and less than 0.3 mass % of silicon, 0.10 mass % or more and 0.50 mass % or less of manganese, and 1.30 mass % or more and 2.00 mass % or less of chromium, with the rest made up of iron and an impurity; carbonitriding the formed body by heating the formed body to a carbonitriding temperature in a carbonitriding atmosphere containing ammonia, carbon monoxide, carbon dioxide, and hydrogen; and diffusing nitrogen in the formed body by keeping the carbonitrided formed body at a diffusing temperature equal to or lower than the carbonitriding temperature, in a diffusing atmosphere containing ammonia, carbon monoxide, carbon dioxide, and hydrogen. The carbonitriding atmosphere has $a_c^*$ set to 0.88 or more and 1.27 or less and α set to 0.012 or more and 0.020 or less and the diffusing atmosphere has $a_c^*$ set to 0.88 or more and 1.27 or less and α set to 0.003 or more and 0.012 or less, the $a_c^*$ and the a are defined respectively by a formula (1) and a formula (2):

$$a_c^* = \frac{(Pco)^2}{K \times Pco_2} \quad (1)$$

where

Pco: a partial pressure (atm) of carbon monoxide,
Pco$_2$: a partial pressure (atm) of carbon dioxide, and
K: <C>+CO$_2$⇔equilibrium constant of 2CO, $$\alpha = \frac{P_N}{0.006 \times (P_H)^{\frac{3}{2}}} \times \frac{(1.877 - 1.055 \times a_c^*)}{100} \quad (2)$$

where $P_N$ is a partial pressure of undecomposed ammonia and $P_H$ is a partial pressure of hydrogen.

Regarding the method of manufacturing a bearing part of the present invention, the carbonitriding process and the diffusing process are successively performed on the formed body made of a steel having an appropriate composition as described above. The diffusing process is performed to thereby eliminate local excess of nitrogen in the formed body and suppress formation of an incompletely quenched structure. For the diffusing process to be performed, not only $a_c^*$ but also α is adjusted to an appropriate value to thereby suppress separation of nitrogen from the surface layer region in the diffusing process, and thus the surface layer region having an appropriate nitrogen content can be obtained. Accordingly, the method of manufacturing a bearing part of the present invention can be used to manufacture a bearing part that can ensure a high durability even in a harsh usage environment.

The method of manufacturing a bearing part may further include the step of performing a tempering process of heating the formed body to a temperature range of 170° C. or more and 220° C. or less and cooling the formed body, after the step of diffusing nitrogen in the formed body. Accordingly, the contact surface of the bearing part can be given an appropriate hardness and an adequate static load capacity can be ensured.

Advantageous Effects of Invention

As is apparent from the foregoing description, the bearing part, the rolling bearing, and the method of manufacturing a bearing part of the present invention enable the bearing part, the rolling bearing, and the method of manufacturing a bearing part that can ensure a high durability even in a harsh usage environment to be provided. The bearing part according to the present invention can achieve both the improvement in durability and the improvement in dimensional stability.

BRIEF DESCRIPTION OF DRAWINGS

FIG. 3 is a schematic cross-sectional view showing a structure of a thrust roller bearing.
FIG. 4 is a schematic partial cross-sectional view of a race in FIG. 3.
FIG. 5 is a schematic cross-sectional view of a roller in FIG. 3.
FIG. 6 is a flowchart generally showing a method of manufacturing a rolling bearing.

DESCRIPTION OF EMBODIMENTS

Figure 1:
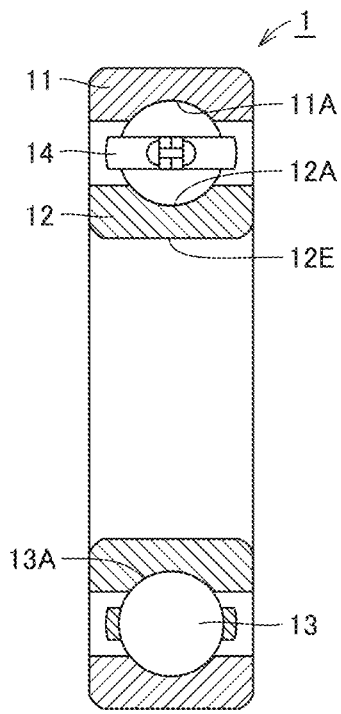
FIG. 1 is a schematic cross-sectional view showing a structure of a deep-groove ball bearing.

Embodiments of the present invention will hereinafter be described based on the drawings. In the following drawings, the same or corresponding parts are denoted by the same reference numerals, and a description thereof will not be repeated.

First Embodiment

Figure 2:
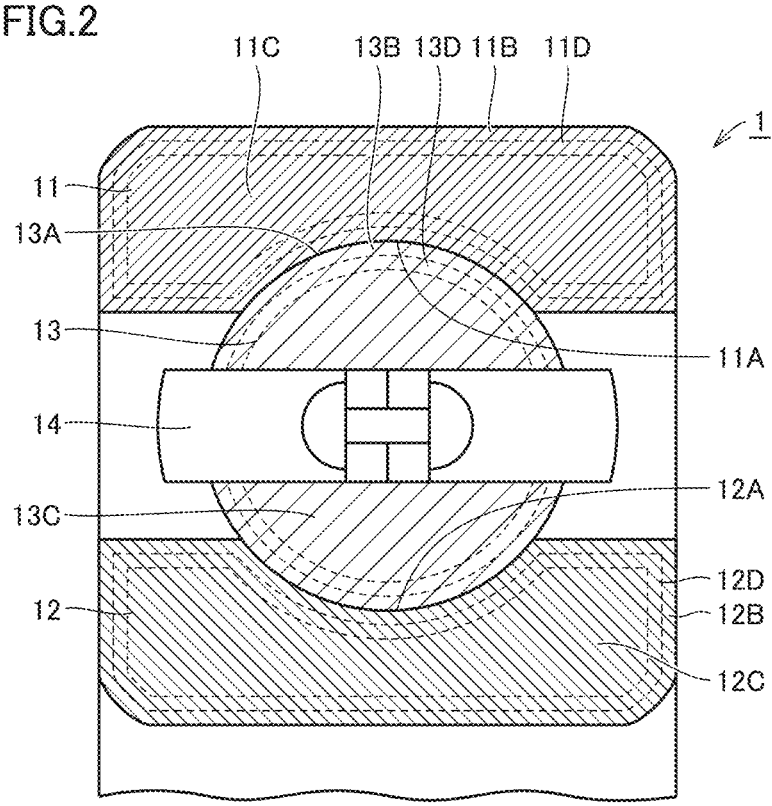
FIG. 2 is a schematic partial cross-sectional view showing, in an enlarged form, a principal part in FIG. 1.

Referring first to FIGS. 1 and 2, an embodiment of the present invention will be described based on an example rolling bearing including races and balls which are each a bearing part. A deep-groove ball bearing 1 includes an outer ring 11 as a first race member which is a bearing part, an inner ring 12 as a second race member which is a bearing part, a plurality of balls 13 as rolling elements which are each a bearing part, and a cage 14. On outer ring 11, an outer ring raceway surface 11A as a first raceway surface in an annular shape is formed. On inner ring 12, an inner ring raceway surface 12A as a second raceway surface in an annular shape is formed opposite to outer ring raceway surface 11A. On a plurality of balls 13 each, a ball rolling surface 13A (surface of ball 13) as a rolling element raceway surface is formed. Outer ring raceway surface 11A, inner ring raceway surface 12A, and ball rolling surface 13A are respective contact surfaces of these bearing parts. Ball 13 has its ball rolling surface 13A in contact with each of outer ring raceway surface 11A and inner ring raceway surface 12A. By means of annular cage 14, balls 13 are arranged in the circumferential direction at predetermined pitches. Thus, the balls are held so that they can freely roll on the annular races. With the above-described structure, outer ring 11 and inner ring 12 of deep-groove ball bearing 1 are rotatable relative to each other.

Referring to FIG. 2, outer ring 11, inner ring 12, and ball 13 are each a bearing part and made of a steel containing 0.95 mass % or more and 1.10 mass % or less of carbon, 0.05 mass % or more and less than 0.3 mass % of silicon, 0.10 mass % or more and 0.50 mass % or less of manganese, and 1.30 mass % or more and 2.00 mass % or less of chromium, with the rest made up of iron and an impurity, for example, made of SUJ2 which is a high-carbon chromium bearing steel defined by the JIS standards. In regions respectively including outer ring raceway surface 11A, inner ring raceway surface 12A, and ball rolling surface 13A serving as contact surfaces, nitrogen-rich layers 11D, 12D, 13D which are higher in nitrogen concentration than inner portions 11C, 12C, 13C, respectively, are formed. Surface layer regions 11B, 12B, 13B extending to a depth of not more than 20 μm from outer ring raceway surface 11A, inner ring raceway surface 12A, and ball rolling surface 13A which serve as contact surfaces and are respective surfaces of nitrogen-rich layers 11D, 12D, 13D have an average nitrogen concentration of 0.2 mass % or more and 0.7 mass % or less. Surface layer regions 11B, 12B, 13B also have a carbon concentration of 0.9 mass % or more and 1.3 mass % or less. Further, in surface layer regions 11B, 12B, 13B, five or more carbides having a diameter of 0.5 μm or less are present per 100 μm$^2$.

In outer ring 11, inner ring 12, and ball 13 which are each a bearing part in the present embodiment, surface layer regions 11B, 12B, 13B under the contact surfaces have a nitrogen concentration of 0.2 mass % or more and 0.7 mass % or less, and five or more carbides with a diameter of 0.5 μm or less are present per 100 μm$^2$ in surface layer regions 11B, 12B, 13B. Accordingly, outer ring 11, inner ring 12, and ball 13 are bearing parts that can ensure a high durability even in a harsh usage environment. Moreover, preferably 10 or more carbides are present in the aforementioned regions each. It should be noted that the amount (number) of carbides present in the regions can be confirmed for example through observation of the regions with a scanning electron microscope (SEM) and an image analysis of the result of the observation.

Moreover, in outer ring 11, inner ring 12, and ball 13 each, preferably the average nitrogen concentration is 0.7 mass % or less across the whole region extending to a depth of not more than 20 μm from the surface. In this way, not only in the contact surfaces of outer ring 11, inner ring 12, and ball 13 but also in regions other than the contact surfaces, such as a recessed portion for example which will not be ground after the nitrogen-rich layer is formed, formation of an incompletely quenched structure is suppressed.

Further, outer ring raceway surface 11A, inner ring raceway surface 12A, and ball rolling surface 13A which are contact surfaces of outer ring 11, inner ring 12, and ball 13 preferably have a hardness of 700 HV or more. Accordingly, even when outer ring 11, inner ring 12, and ball 13 are used in a harsh environment, an adequate static load capacity can be ensured.

Moreover, outer ring raceway surface 11A, inner ring raceway surface 12A, and ball rolling surface 13A which are contact surfaces of outer ring 11, inner ring 12, and ball 13 each have retained austenite of an amount of preferably 20 vol % or more and 35 vol % or less, and more preferably 25 vol % or more and 35 vol % or less. Accordingly, the durability of outer ring 11, inner ring 12, and ball 13 in a foreign-matters intrusion environment can be improved, while an adequate hardness of outer ring raceway surface 11A, inner ring raceway surface 12A, and ball rolling surface 13A is maintained.

Further, in the whole of outer ring 11, inner ring 12, and ball 13, an average amount of retained austenite is preferably 18 vol % or less, and more preferably 15 vol % or less. Accordingly, the improvement in dimensional stability of outer ring 11, inner ring 12, and ball 13 can be achieved.

Moreover, in outer ring 11, inner ring 12, and ball 13, a difference between a maximum value and a minimum value of a hardness is 130 HV or more, which is determined from a hardness distribution measured in a depth direction in a cross section perpendicular to the contact surface, after they are kept at 500° C. for an hour. In such outer ring 11, inner ring 12, and ball 13, introduction of nitrogen of an adequate concentration is ensured.

Moreover, in surface layer regions 11B, 12B, 13B each, a carbonitrided layer is formed. An area ratio of a precipitate in a region where the carbonitrided layer is not formed is preferably 7% or less, and more preferably 5% or less. The precipitate is a carbonitride or the like in which a part of a carbide of iron or a part of carbon of the carbide is replaced with nitrogen, and includes an Fe—C-based compound and Fe—C—N-based compound. This carbonitride may include an alloy component included in the steel. Thus, with the area ratio of the precipitate kept low, the amount of a solid solute such as carbon dissolved in the base can be increased to thereby further improve the life of the bearing part. Moreover, preferably a precipitate is present in a surface other than outer ring raceway surface 11A, inner ring raceway surface 12A, and ball rolling surface 13A which are contact surfaces of outer ring 11, inner ring 12, and ball 13.

Referring next to FIGS. 3 to 5, a rolling bearing including bearing parts in another embodiment will be described. A thrust needle roller bearing 2 basically has a similar structure and similar effects to the above-described deep-groove ball bearing 1. Thrust needle roller bearing 2, however, is different from deep-groove ball bearing 1 in terms of the structures of the race member and the rolling element. Specifically, thrust needle roller bearing 2 includes: a pair of races 21 serving as race members having a disk shape and arranged so that one main surface of one race and one main surface of the other race are opposite to each other; a plurality of needle rollers 23 serving as rolling elements; and an annular cage 24. A plurality of needle rollers 23 each have a roller rolling contact surface 23A which is an outer peripheral surface of needle roller 23, and rolling contact surface 23A is in contact with raceway surfaces 21A formed on respective main surfaces opposite to the other of the pair of races 21. By means of cage 24, needle rollers 23 are arranged in the circumferential direction at predetermined pitches. Thus the rollers are held so that they can freely roll on the annular races. With the above-described structure, races 21 of the race pair of thrust needle roller bearing 2 are rotatable relative to each other.

Races 21 of thrust needle roller bearing 2 correspond to outer ring 11 and inner ring 12 of deep-groove ball bearing 1, and needle rollers 23 of thrust needle roller bearing 2 correspond to balls 13 of the deep-groove ball bearing. The parts of thrust needle roller bearing 2 are made of a similar material to deep-groove ball bearing 1, and have a similar nitrogen concentration and a similar state of distribution of carbides (including carbonitrides) thereto, for example. Namely, race 21 and needle roller 23 have a raceway surface 21A (corresponding to outer ring raceway surface 11A and inner ring raceway surface 12A) and a rolling contact surface 23A (corresponding to ball rolling surface 13A), surface layer regions 21B, 23B (corresponding to surface layer regions 11B, 12B, 13B), inner portions 21C, 23C (corresponding to inner portions 11C, 12C, 13C), and nitrogen-rich layers 21D, 23D (corresponding to nitrogen-rich layers 11D, 12D, 13D) having respective structures similar to those of deep-groove ball bearing 1. Accordingly, race 21 and needle roller 23 are bearing parts that can ensure a high durability even in a harsh usage environment.

Next, a method of manufacturing the bearing part and the rolling bearing in the above-described embodiments will be described. Referring to FIG. 6, a step of preparing a formed body is performed first as a step (S10). In this step (S10), a steel is prepared that contains 0.95 mass % or more and 1.10 mass % or less of carbon, 0.05 mass % or more and less than 0.35 mass % of silicon, 0.10 mass % or more and 0.50 mass % or less of manganese, and 1.30 mass % or more and 2.00 mass % or less of chromium, with the rest made up of iron and an impurity, for example, SUJ2 defined by the JIS standards is prepared. Specifically, a steel rod, steel wire, or the like having the aforementioned composition is prepared. Then, the steel material is subjected to forging, turning, and the like to produce a formed body formed in a certain shape such as outer ring 11, inner ring 12, ball 13, race 21, needle roller 23, or the like shown in FIGS. 1 to 5.

Next, a carbonitriding step is performed as a step (S20). In this step (S20), the formed body prepared in the step (S10) is subjected to a carbonitriding process. This carbonitriding process can be performed for example in the following way. First, the formed body is preheated in a temperature range of approximately 780° C. or more and 820° C. or less for a period of 30 minutes or more and 90 minutes or less. Next, the preheated formed body is heated to a carbonitriding temperature in a carbonitriding atmosphere containing ammonia, carbon monoxide, carbon dioxide, and hydrogen, and accordingly the formed body is carbonitrided. At this time, for the carbonitriding atmosphere, $a_c^*$ is set to 0.88 or more and 1.27 or less and α is set to 0.012 or more and 0.020 or less. Specifically, in an atmosphere in which an endothermic gas such as RX gas has $a_c^*$ adjusted by addition of propane gas or butane gas which serves as an enrich gas and ammonia gas is further introduced to the endothermic gas to adjust α, the formed body is heated for being carbonitrided. The temperature for the carbonitriding process (carbonitriding temperature) can for example be 820° C. or more and 900° C. or less, and is preferably 820° C. or more and 880° C. or less. The time for the carbonitriding process can be set depending on the nitrogen concentration of a desired nitrogen-rich layer, and can for example be 4 hours or more and 10 hours or less. Accordingly, the nitrogen-rich layer can be formed with carbides appropriately dispersed in the surface layer region of the formed body.

Next, a diffusing step is performed as a step (S30). In this step (S30), the formed body is kept at a diffusing temperature which is a temperature equal to or less than the aforementioned carbonitriding temperature, in a diffusing atmosphere containing ammonia, carbon monoxide, carbon dioxide, and hydrogen. Thus, a diffusing process of diffusing nitrogen in the formed body inward is performed. At this time, for the diffusing atmosphere, $a_c^*$ is set to 0.88 or more and 1.27 or less and α is set to 0.003 or more and 0.012 or less. Specifically, in an atmosphere in which an endothermic gas such as RX gas has $a_c^*$ adjusted by addition of propane gas or butane gas which serves as an enrich gas and ammonia gas is further introduced to the endothermic gas to adjust α, the formed body is heated for being subjected to the diffusing process. The temperature for the diffusing process (diffusing temperature) can for example be 780° C. or more and 900° C. or less, and is preferably 820° C. or more and 900° C. or less. The time for the diffusing process can for example be one hour or more and five hours or less. Accordingly, with an appropriate state of distribution of carbides maintained in the surface layer region of the formed body, nitrogen is diffused to suppress formation of an incompletely quenched structure and suppress separation of nitrogen from the surface. Thus, the nitrogen concentration in the surface layer region can be adjusted to an appropriate range.

Next, a quenching step is performed as a step (S40). In this step (S40), the formed body in which the nitrogen-rich layer is formed in the steps (S20) to (S30) is rapidly cooled from a predetermined hardening temperature and thus undergoes a quenching process. The hardening temperature can for example be 820° C. or more and 900° C. or less, and is preferably 850° C. or more and 900° C. or less. The quenching process can be performed for example by immersing the formed body in a quenching oil serving as a coolant held at a predetermined temperature. Moreover, in this step (S40), preferably the region to serve as a surface layer portion under the contact surface of the formed body is cooled at an average cooling rate of 20° C./sec or more in a temperature range from the hardening temperature to 600° C. and an average cooling rate of 30° C./sec or more in a temperature range from the hardening temperature to 400° C. Accordingly, the region to become a surface layer portion where the quenchability is deteriorated due to formation of the nitrogen-rich layer can reliably be quench-hardened.

Next, a tempering step is performed as a step (S50). In this step (S50), the formed body subjected to the quenching process in the step (S40) is subjected to a tempering process. Specifically, in an atmosphere heated to a temperature range for example of 170° C. or more and 220° C. or less (preferably 180° C. or more and 210° C. or less), the formed body is held for a period of 0.5 hours or more and 4 hours or less, and thus the tempering process is performed.

Next, a finishing step is performed as a step (S60). In this step (S60), the formed body subjected to the tempering process in the step (S50) is processed to thereby form a contact surface which is to be in contact with another part, namely form outer ring raceway surface 11A, inner ring raceway surface 12A, and ball rolling surface 13A of deep-groove ball bearing 1, and raceway surface 21A and rolling contact surface 23A of thrust needle roller bearing 2. As finishing, grinding for example may be performed. Through the above-described steps, outer ring, 11, inner ring 12, ball 13, race 21, needle roller 23, and the like which are each a bearing part in the present embodiment are completed.

Further, an assembling step is performed as a step (S70). In this step (S70), outer ring 11, inner ring 12, balls 13, races 21, needle rollers 23 prepared in the steps (S10) to (S60) and cages 14, 24 prepared separately are combined and assembled into deep-groove ball bearing 1 and thrust needle roller bearing 2 in the above-described embodiments. Thus, the method of manufacturing a rolling bearing in the present embodiment comes to an end.

Here, in order to achieve an average nitrogen concentration of 0.2 mass % or more and 0.7 mass % or less in the surface layer region which is defined as a region extending from the contact surface to a depth of not more than 20 µm, the nitrogen-rich layer is formed in the formed body in the above-described steps (S20) to (S30), so that the nitrogen concentration is 0.2 mass % or more and 0.7 mass % or less in surface layer regions 11B, 12B, 13B, 21B, 23B under respective contact surfaces by the finishing in the subsequent step (S60). Namely, nitrogen-rich layers 11D, 12D, 13D, 21D, 23D are formed in which the amount of nitrogen is adjusted in consideration of a process allowance in the step (S60) for example, so that the nitrogen concentration in the surface layer portion after the contact surface is formed can be 0.2 mass % or more and 0.7 mass % or less. At this time, preferably the nitrogen concentration is set to 0.7 mass % or less also in a region (recessed portion for example) whose surface layer portion is not removed by the finishing, to thereby suppress occurrence of an incompletely quenched structure. In order to accomplish this, it is necessary to adjust the nitrogen concentration in the surface layer region to 0.7 mass % or less at the time the step (S30) is completed.

Further, in order to achieve a hardness of the contact surface of 700 HV or more, it is necessary to appropriately set the heating temperature in the step (S50). Specifically, the tempering temperature can for example be 170° C. or more and 220° C. or less. Moreover, in order to adjust the amount of retained austenite to an appropriate value in outer ring 11, inner ring 12, ball 13, race 21, and needle roller 23, it is necessary to adjust the hardening temperature in the step (S40).

Through the foregoing procedure, the bearing part and the rolling bearing of the present embodiments can be manufactured.

It should be noted that the deep-groove ball bearing and the thrust roller bearing, as well as the bearing parts forming them that are described above in connection with the above-described embodiments are examples of the rolling bearing and the bearing part of the present invention. The rolling bearing and the bearing part of the present invention are applicable to rolling bearings of a variety of forms.

Second Embodiment

Figure 7:
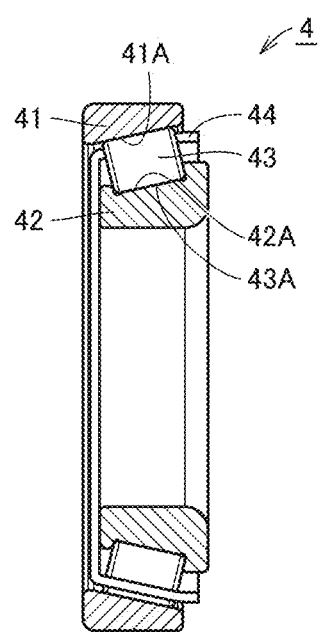
FIG. 7 is a schematic cross-sectional view showing a structure of a tapered roller bearing.

Referring next to FIG. 7, a structure of a tapered roller bearing 4 which is a rolling bearing in another embodiment of the present invention will be described. Tapered roller bearing 4 includes annular outer ring 41 and inner ring 42, a plurality of rollers 43 serving as rolling elements, and an annular cage 44. On the inner circumferential surface of outer ring 41, an outer ring raceway surface 41A is formed. On the outer circumferential surface of inner ring 42, an inner ring raceway surface 42A is formed. Inner ring 42 is arranged inside outer ring 41 so that inner ring raceway surface 42A is opposite to outer ring raceway surface 41A.

Rollers 43 each have a rolling surface 43A which is in contact with outer ring raceway surface 41A and inner ring raceway surface 42A, and are arranged by cage 44 in the circumferential direction at predetermined pitches. Thus, rollers 43 are held so that they can freely roll on the annular races of outer ring 41 and inner ring 42. Moreover, tapered roller bearing 4 is structured so that a cone including outer ring raceway surface 41A, a cone including inner ring raceway surface 42A, and a cone including the track of the rotational shafts of rollers 43 in the case where rollers 43 roll have respective apexes that meet at one point on the central line of the bearing. With the above-described structure, outer ring 41 and inner ring 42 of tapered roller bearing 4 are rotatable relative to each other. Outer ring 41, inner ring 42, and rollers 43 are each a bearing part in the present embodiment.

The bearing parts (outer ring 41, inner ring 42, roller 43) in the present embodiment are each made of a steel having a basically similar composition to the bearing part in the first embodiment, and have a basically similar structure to the bearing part in the first embodiment.

Next, a method of manufacturing a bearing part and a rolling bearing in the present embodiment will be described. Regarding the method of manufacturing a bearing part in the present embodiment, basically similar steps to the method of manufacturing a bearing part and a rolling bearing in the first embodiment are performed to thereby manufacture outer ring 41, inner ring 42, and roller 43 which are each a bearing part, as well as tapered roller bearing 4 in the present embodiment.

Referring to FIG. 6, a step of preparing a formed body is first performed as a step (S10). In this step (S10), a steel material having a similar composition to the first embodiment is prepared, and this steel material is processed into a formed body which is generally formed in a shape such as outer ring 41, inner ring 42, and roller 43.

Next, steps (S20) to (S60) are performed similarly to the first embodiment. Accordingly, outer ring 41, inner ring 42, and roller 43 (see FIG. 7) which are each a bearing part in the present embodiment are manufactured, and the method of manufacturing a bearing part in the present embodiment is completed. In an assembling step (S70), outer ring 41, inner ring 42, and rollers 43 are combined to thereby manufacture tapered roller bearing 4 (see FIG. 7), and the method of manufacturing a rolling bearing in the present embodiment is completed. It should be noted that the diffusing step (S30) may not be performed in the method of manufacturing a bearing part in the present embodiment. In this case as well, a bearing part (outer ring 41, inner ring 42, and roller 43) in the present embodiment can be manufactured.

Figure 8:
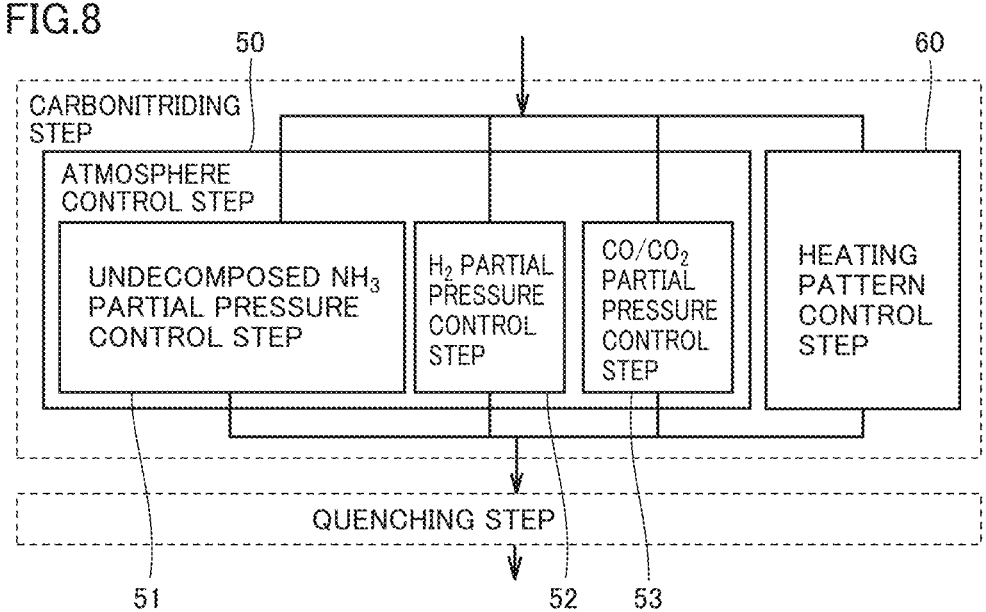
FIG. 8 is a diagram for illustrating details of a quench-hardening step included in a method of manufacturing a bearing part.
Figure 9:
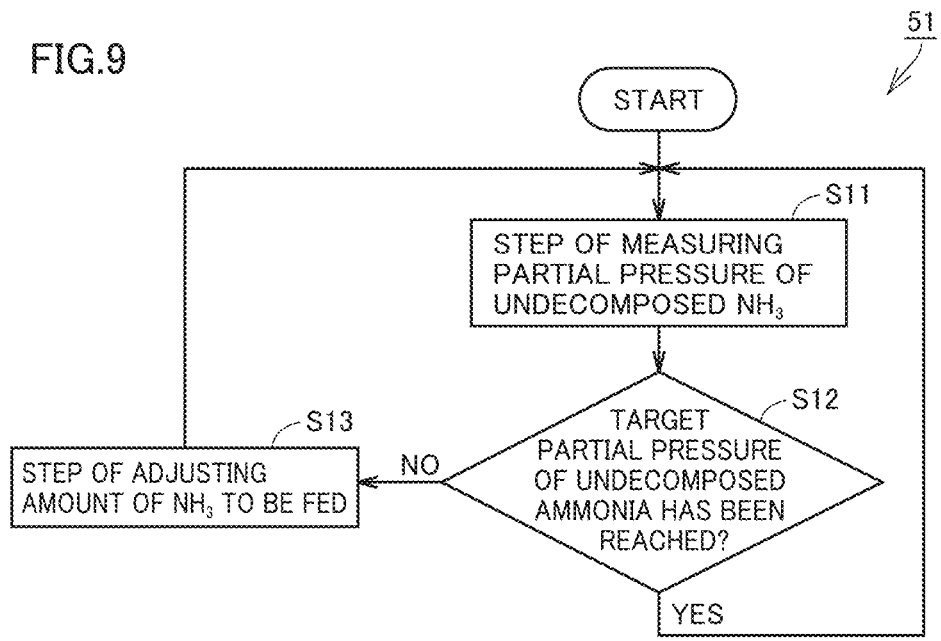
FIG. 9 is a diagram for illustrating an undecomposed NH$_3$ partial pressure control step included in an atmosphere control step in FIG. 8.
Figure 10:
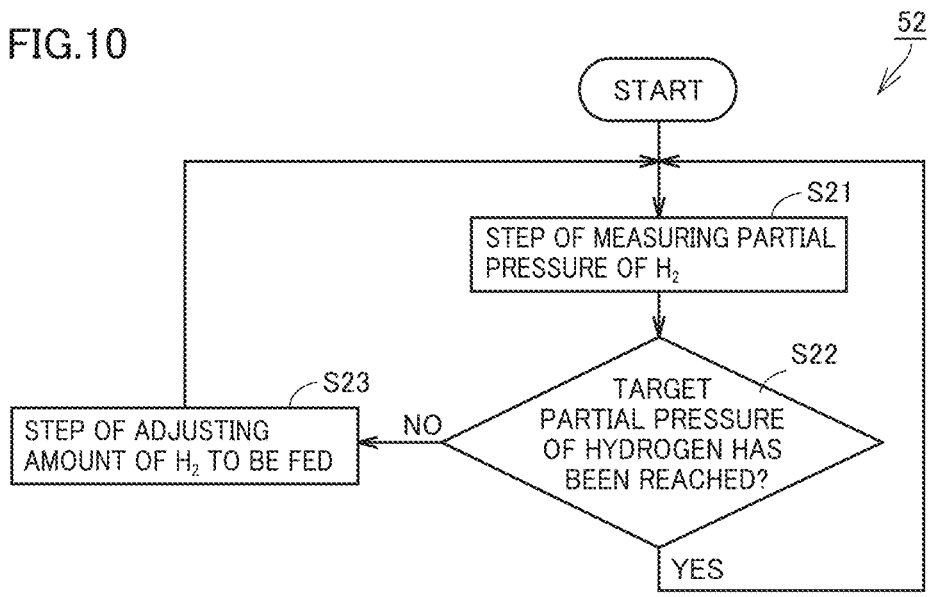
FIG. 10 is a diagram for illustrating an H$_2$ partial pressure control step included in the atmosphere control step in FIG. 8.
Figure 11:
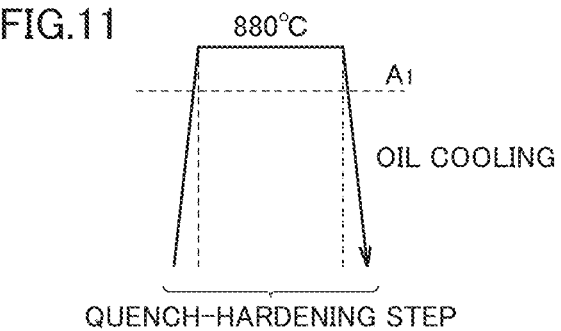
FIG. 11 is a diagram showing an example heating pattern in a heating pattern control step included in a carbonitriding step in FIG. 8.

Next, the step (S20) to the step (S40) which are a quench-hardening step will be described in detail. FIG. 8 is a diagram for illustrating in detail the carbonitriding step (S20) and the quenching step (S40). In FIG. 8, the diffusing step (S30) to be performed after the carbonitriding step (S20) is not shown. FIG. 9 is a diagram for illustrating a step of controlling the partial pressure of undecomposed ammonia ($NH_3$) included in an atmosphere control step in FIG. 8. FIG. 10 is a diagram for illustrating a step of controlling the partial pressure of hydrogen ($H_2$) included in the atmosphere control step in FIG. 8. FIG. 11 is a diagram showing an example heating pattern (temperature history) in a heating pattern control step included in the carbonitriding step in FIG. 8. In FIG. 11, the lateral direction represents time and the time is shown to elapse in the rightward direction. Referring to FIGS. 8 to 11, a description will be given of details of the steps (S20) to (S40) which are the quench-hardening step included in the method of manufacturing a bearing part in the present embodiment.

Referring to FIG. 8, the carbonitriding step of carbonitriding a steel material is first performed. After the diffusing step (not shown) is performed, the steel material is subjected to the quenching step of cooling the steel material from a temperature of the $A_1$ point or more to a temperature of the $M_s$ point or less. In the carbonitriding step, a carbonitriding process is performed by heating the steel material prepared in the step (S10) in an atmosphere containing ammonia, carbon monoxide, carbon dioxide, and hydrogen.

The carbonitriding step includes an atmosphere control step 50 of controlling the atmosphere in a heat treatment furnace, and a heating pattern control step 60 of controlling a temperature history applied in the heat treatment furnace to the steel material which is a work to be processed. These atmosphere control step 50 and heating pattern control step 60 can be performed independently of and in parallel with each other. Atmosphere control step 50 includes an undecomposed $NH_3$ partial pressure control step 51 of controlling the partial pressure of undecomposed ammonia in the heat treatment furnace, an $H_2$ partial pressure control step 52 of controlling the partial pressure of hydrogen in the heat treatment furnace, and a $CO/CO_2$ partial pressure control step 53 of controlling the partial pressure of at least one of carbon monoxide and carbon dioxide in the heat treatment furnace.

With reference to Formula (1), in $CO/CO_2$ partial pressure control step 53, the partial pressure of at least one of carbon monoxide and carbon dioxide in the heat treatment furnace is controlled to thereby control $a_c^*$.

In atmosphere control step 50, undecomposed $NH_3$ partial pressure control step 51, $H_2$ partial pressure control step 52, and $CO/CO_2$ partial pressure control step 53 are performed so that $a_c^*$ defined by Formula (1) is 0.88 or more and 1.27 or less and $\alpha$ in Formula (2) is 0.012 or more and 0.020 or less.

Specifically, referring to FIG. 9, in undecomposed $NH_3$ partial pressure control step 51, a step of measuring the partial pressure of undecomposed $NH_3$ (S11) is first performed for measuring the partial pressure of undecomposed ammonia in the heat treatment furnace. The partial pressure of undecomposed ammonia can be measured for example by means of a gas chromatograph. Then, based on the partial pressure of undecomposed ammonia measured in the step (S11), an undecomposed $NH_3$ partial pressure determination step (S12) is performed for determining whether to perform a step of adjusting the amount of $NH_3$ to be fed (S13), in which the amount of ammonia gas to be fed to the heat treatment furnace is increased or decreased. This determination is made by: comparing a target partial pressure of undecomposed ammonia, which is determined in advance so that the value of $\alpha$ falls in a range of 0.012 or more and 0.020 or less, and the measured partial pressure of undecomposed ammonia; and then determining whether or not the measured partial pressure of undecomposed ammonia is equal to the target partial pressure of undecomposed ammonia.

In the case where the partial pressure of undecomposed ammonia is not equal to the target partial pressure of undecomposed ammonia, the step (S13) is performed for increasing/decreasing the partial pressure of undecomposed ammonia in the heat treatment furnace and thereafter the step (S11) is performed again. This step (S13) can be performed for example by adjusting the amount of ammonia (the flow rate of ammonia gas) flowing into the heat treatment furnace per unit time from an ammonia gas bomb which is coupled through a pipe to the heat treatment furnace, by means of a flow rate control device including a mass flow controller or the like attached to the pipe. Namely, in the case where the measured partial pressure of undecomposed ammonia is higher than the target partial pressure of undecomposed ammonia, the flow rate is decreased. If the former is lower than the latter, the flow rate is increased. In this way, the step (S13) can be performed. In the case where there is a predetermined difference in this step (S13) between the measured partial pressure of undecomposed ammonia and the target partial pressure of undecomposed ammonia, the extent to which the flow rate is increased or decreased can be determined based on a relationship between an increase/decrease of the flow rate of ammonia gas and an increase/decrease of the partial pressure of undecomposed ammonia, which is experimentally determined in advance.

In contrast, in the case where the partial pressure of undecomposed ammonia is equal to the target partial pressure of undecomposed ammonia, the step (S13) is skipped and the step (S11) is performed again.

$H_2$ partial pressure control step 52 is performed similarly to the above-described undecomposed $NH_3$ partial pressure control step 51. Specifically, referring to FIG. 10, in $H_2$ partial pressure control step 52, a step of measuring the partial pressure of $H_2$ (S21) is performed for measuring the partial pressure of hydrogen in the heat treatment furnace. The hydrogen partial pressure can be measured for example by means of a thermal conductivity gas analyzer. Then, based on the partial pressure of hydrogen measured in the step (S21), a hydrogen partial pressure determination step (S22) is performed for determining whether to perform a step of adjusting the amount of $H_2$ to be fed (S23), in which the amount of hydrogen gas to be fed to the heat treatment furnace is increased or decreased. This determination is made by: comparing a target partial pressure of hydrogen, which is determined in advance so that the value of α falls in a range of 0.012 or more and 0.020 or less, and the measured partial pressure of hydrogen; and then determining whether or not the measured partial pressure of hydrogen is equal to the target partial pressure of hydrogen.

In the case where the partial pressure of hydrogen is not equal to the target partial pressure of hydrogen, the step (S23) is performed for increasing/decreasing the partial pressure of hydrogen in the heat treatment furnace and thereafter the step (S21) is performed again. This step (S23) can be performed for example by adjusting the amount of hydrogen (the flow rate of hydrogen) flowing into the heat treatment furnace per unit time from a hydrogen gas bomb which is coupled through a pipe to the heat treatment furnace, by means of a flow rate control device including a mass flow controller or the like attached to the pipe. Namely, in the case where the measured partial pressure of hydrogen is higher than the target partial pressure of hydrogen, the flow rate is decreased. If the former is lower than the latter, the flow rate is increased. In this way, the step (S23) can be performed. In the case where there is a predetermined difference in this step (S23) between the measured partial pressure of hydrogen and the target partial pressure of hydrogen, the extent to which the flow rate is increased or decreased can be determined based on a relationship between an increase/decrease of the flow rate of hydrogen gas and an increase/decrease of the partial pressure of hydrogen, which is experimentally determined in advance, similarly to the case of ammonia.

In contrast, in the case where the partial pressure of hydrogen is equal to the target partial pressure of hydrogen, the step (S23) is skipped and the step (S21) is performed again.

Referring to FIG. 8, in $CO/CO_2$ partial pressure control step 53, the amount of propane ($C_3H_8$) gas, butane ($C_4H_{10}$) gas, or the like serving as an enrich gas to be fed is adjusted to thereby control the partial pressure of at least one of CO and $CO_2$ and thus adjust $a_c^*$. Specifically, for example, an infrared gas density measurement device is used to measure a partial pressure $P_{CO}$ of carbon monoxide and a partial pressure $P_{CO2}$ of carbon dioxide in the atmosphere. Then, based on the measurements, the amount of propane ($C_3H_8$) gas, butane ($C_4H_{10}$) gas, or the like serving as an enrich gas to be fed is adjusted so that $a_c^*$ defined by Formula (1) is a target value within a range of 0.88 or more and 1.27 or less.

Here, with reference to Formula (2), the value of α can be controlled by changing at least any one of the partial pressure of undecomposed ammonia, the partial pressure of hydrogen, and $a_c^*$ respectively in undecomposed $NH_3$ partial pressure control step 51, $H_2$ partial pressure control step 52, and $CO/CO_2$ partial pressure control step 53. Namely, the value of α may be controlled, for example, by keeping the partial pressure of undecomposed ammonia and $a_c^*$ constant in undecomposed $NH_3$ partial pressure control step 51 and $CO/CO_2$ partial pressure control step 53 and changing the partial pressure of hydrogen in $H_2$ partial pressure control step 52, or keeping the partial pressure of hydrogen and the value of $a_c^*$ constant in $H_2$ partial pressure control step 52 and $CO/CO_2$ partial pressure control step 53 and changing the partial pressure of undecomposed ammonia in undecomposed $NH_3$ partial pressure control step 51.

Further, referring to FIG. 8, in heating pattern control step 60, the heating history applied to the steel material is controlled. Specifically, as shown in FIG. 11, in the atmosphere controlled by the above-described atmosphere control step 50, the steel material is heated to a temperature of 820° C. or more and 900° C. or less (preferably a temperature of 820° C. or more and 880° C. or less, 880° C. for example) which is a temperature equal to or more than the $A_1$ point, and held for a predetermined time. As this time has elapsed, the heating pattern control step comes to an end and simultaneously the atmosphere control step comes to an end. After this, referring to FIG. 8, the diffusing step (not shown) is performed and thereafter the quenching step is performed in which the steel material is immersed in an oil (oil cooling) and accordingly cooled from a temperature of the $A_1$ point or more to a temperature of the $M_s$ point or less. Through the above-described steps, a surface layer portion of the steel material is carbonitrided and quench-hardened.

As seen from the foregoing, in the method of manufacturing a bearing part in the present embodiment, the carbonitriding process is performed at 820° C. or more and 900° C. or less (880° C. for example) to thereby form a carbonitrided layer in the step (S20), and the tempering process is performed at a temperature of 170° C. or more and 220° C. or less in the step (S50). Accordingly, outer ring 41, inner ring 42, and roller 43 that are each a bearing part in the present embodiment can be manufactured that achieve both an improved durability and an improved dimensional stability which are obtained from the fact that a large amount of carbon is solid-dissolved in a region (base) where the carbonitrided layer is not formed, and that the amount of retained austenite in the surface layer portion and the average amount of austenite in the whole are balanced. In the step (S20), the carbonitriding process is performed so that $a_c^*$ defined by Formula (1) is 0.88 or more and 1.27 or less and α defined by Formula (2) is 0.012 or more and 0.020 or less. Accordingly, the carbon concentration in the surface layer portion of the bearing part can appropriately be kept and the efficiency of the carbonitriding process can be improved. Consequently, the cost of manufacturing the bearing part can be reduced.

EXAMPLES

Example 1

An experiment was conducted for confirming the necessity of atmosphere management in the carbonitriding process. Specifically, the experiment was conducted in which the carbonitriding process was performed on a specimen made of SUJ2 with respective values of $a_c^*$ and α changed, and the carbon concentration and the nitrogen concentration in the vicinity of the surface were confirmed.

Figure 12:
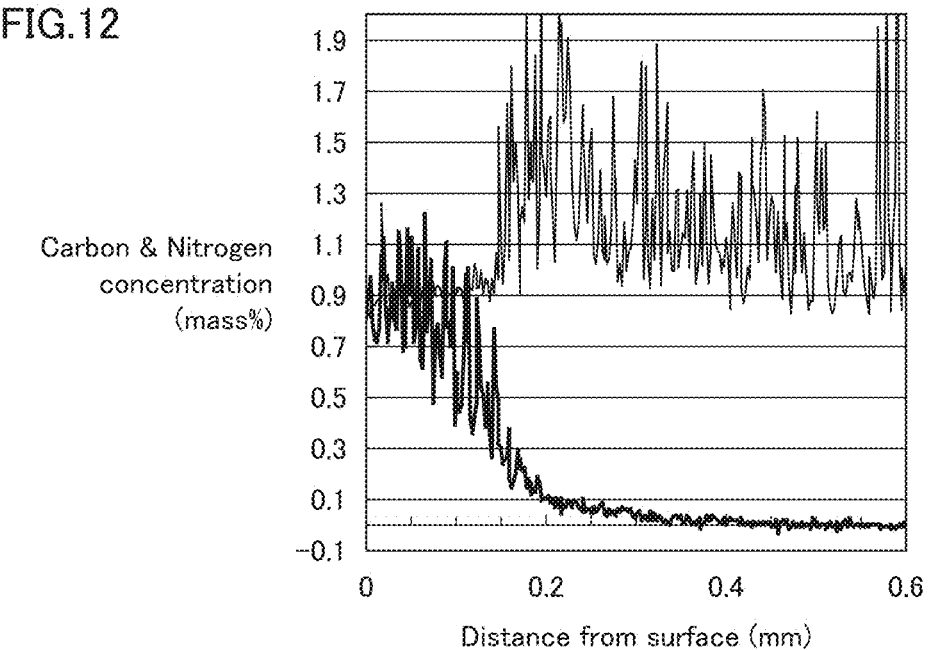
FIG. 12 is a diagram showing a carbon concentration and a nitrogen concentration in the vicinity of a surface in the case where $a_c^*$ is 0.8.
Figure 13:
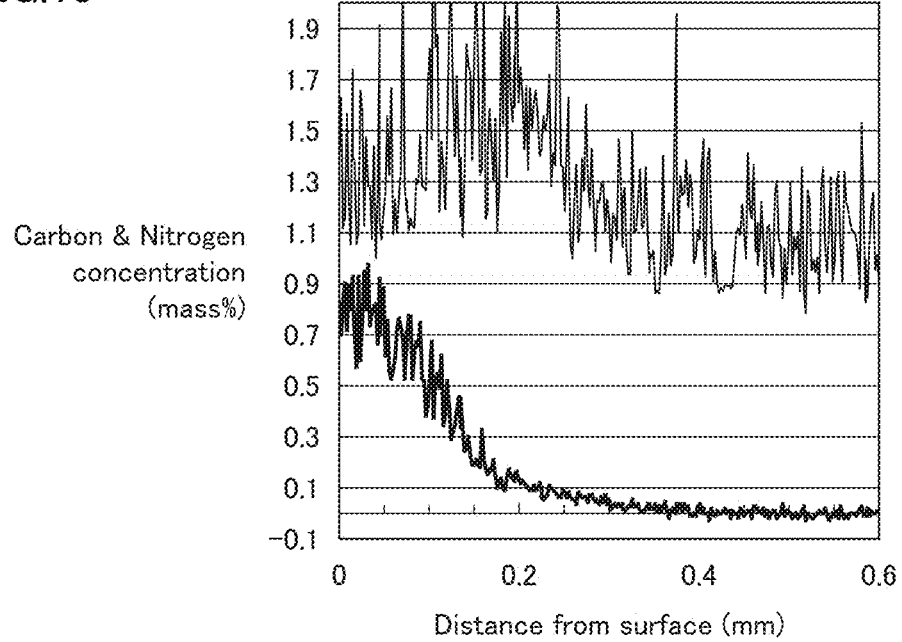
FIG. 13 is a diagram showing a carbon concentration and a nitrogen concentration in the vicinity of a surface in the case where $a_c^*$ is 0.95.

FIG. 12 shows carbon and nitrogen concentration distributions in the case where the carbonitriding process was performed for 2.5 hours in an atmosphere where $a_c^*$ was adjusted to 0.80 and α was adjusted to 0.017. FIG. 13 shows carbon and nitrogen concentration distributions in the case where the carbonitriding process was performed for 2.5 hours in an atmosphere where $a_c^*$ was 0.95 and α was 0.017. In FIGS. 12 and 13 each, the thinner line represents the carbon concentration distribution and the bolder line represents the nitrogen concentration distribution. As to both FIGS. 12 and 13, respective values of α are identical to each other and therefore the specimens have been nitrided normally. In the case of FIG. 12, however, $a_c^*$ is less than 0.88 and therefore carbides in the vicinity of the surface have disappeared and a slight amount of carbon in the base phase has also been separated.

Figure 14:
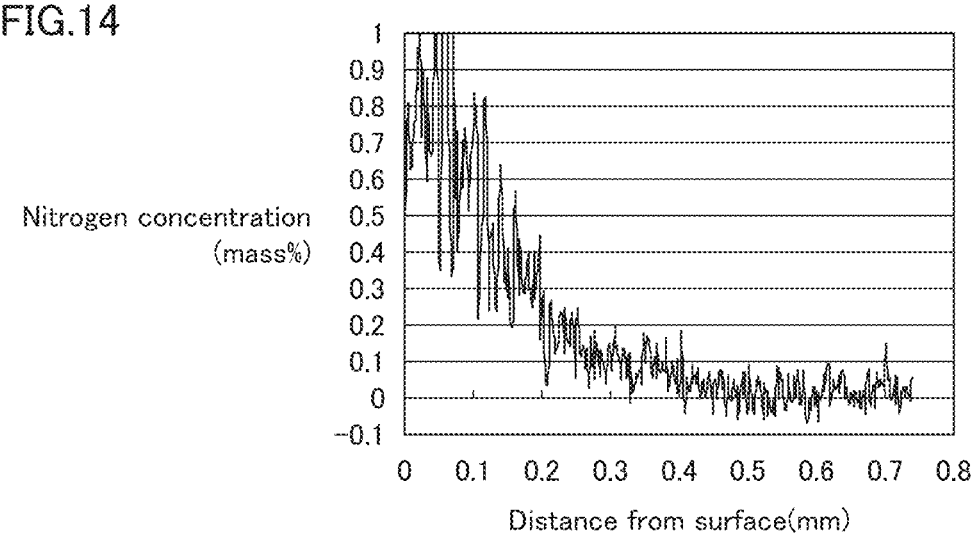
FIG. 14 is a diagram showing a nitrogen concentration in the vicinity of a surface in the case where α is 0.017.
Figure 15:
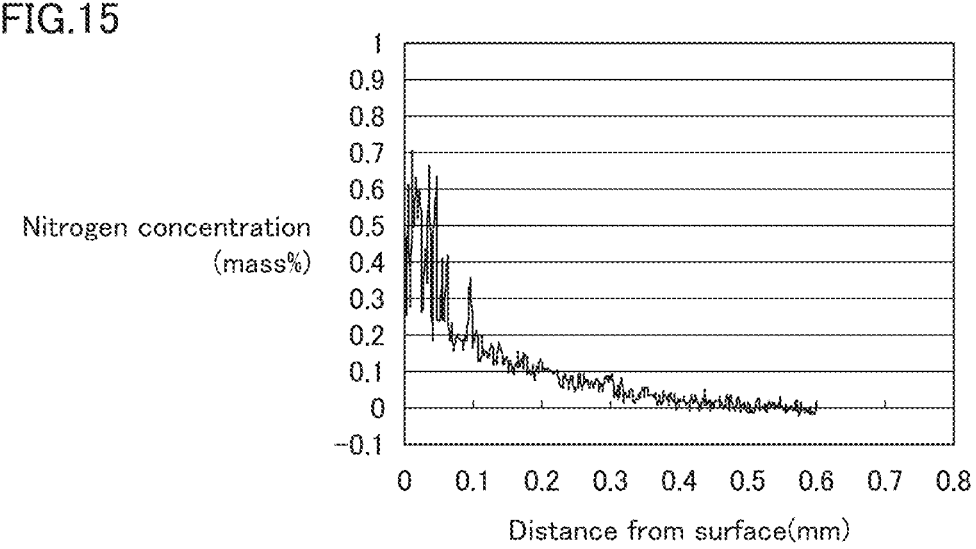
FIG. 15 is a diagram showing a nitrogen concentration in the vicinity of a surface in the case where α is 0.005.

FIG. 14 shows a nitrogen concentration distribution in the case where the carbonitriding process was performed for five hours in an atmosphere where $a_c^*$ was 1 and α was 0.017, and FIG. 15 shows a nitrogen concentration distribution in the case where the carbonitriding process was performed for five hours in an atmosphere where $a_c^*$ was 1 and α was 0.005. While respective process times of carbonitriding are identical to each other, the amount of introduced nitrogen is smaller in FIG. 15 where α is smaller, relative to FIG. 14 where α falls in an appropriate range.

It is seen from the foregoing experimental results that management of $a_c^*$ and α in the carbonitriding process is important. It is necessary to keep $a_c^*$ in a range of 0.88 to 1.27 and keep α in a range of 0.012 to 0.02.

Example 2

An experiment was conducted for confirming the necessity of the diffusing process after the carbonitriding process. Specifically, the experiment was conducted in which carbonitriding processes with different conditions were performed on specimens each made of SUJ2 to produce samples different in nitrogen concentration from each other, and the relationship between the nitrogen concentration, the surface hardness, and the half width was examined. Here "half width" means a half width of a peak (142.3 to 170.2°) corresponding to martensite measured by means of Kα radiation from a Cr vacuum tube.

Figure 16:
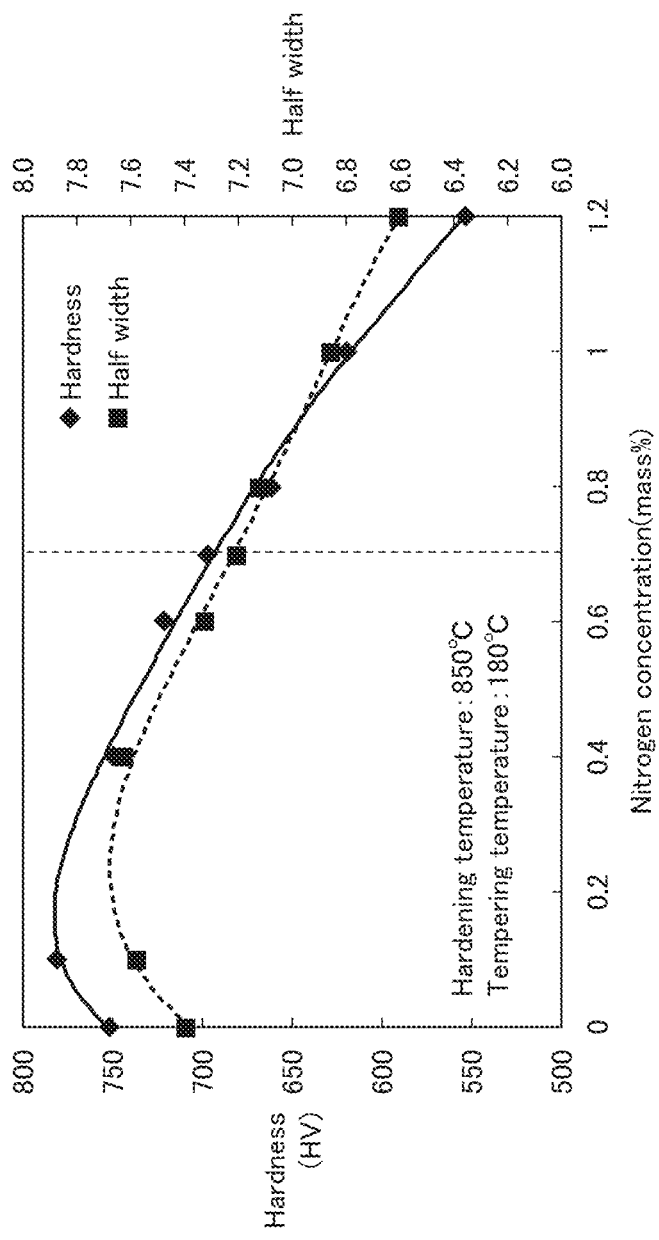
FIG. 16 is a diagram showing a relationship between a nitrogen concentration, a hardness, and a half width.
Figure 17:
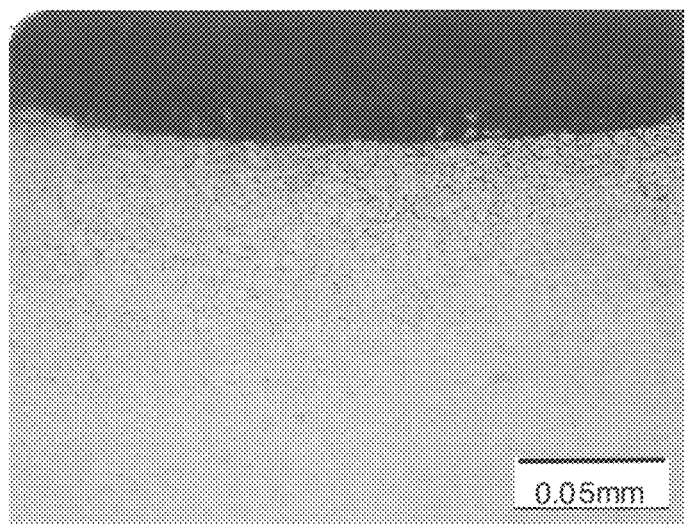
FIG. 17 is a photograph showing a microstructure in the case where a surface layer region has an average nitrogen concentration of 1.0 mass %.

FIG. 16 shows a relationship between the nitrogen concentration (average nitrogen concentration) in a surface layer region, the surface hardness, and the half width, obtained from the results of the experiment. Referring to FIG. 16, in the case where the nitrogen concentration in the surface layer region is 0.7 mass % or more, the hardness is 700 HV or less and the half width is 7.0 or less. It is seen from this that an incompletely quenched structure is generated in the surface layer region in the case where the nitrogen concentration in the surface layer region is 0.7 mass % or more. FIG. 17 is a photograph of a microstructure in the case where the nitrogen concentration in the surface layer region is 1.0 mass %. It is confirmed from this photograph that an incompletely quenched structure is formed in the vicinity of the surface. Thus, in order to avoid formation of an incompletely quenched structure in the vicinity of the surface, the nitrogen concentration in the surface layer region having a significant influence on the rolling fatigue life should be 0.7 mass % or less.

It should be noted that in order to efficiently form a nitrogen-rich layer having a relatively high concentration (0.2 mass % or more for example), it is preferable to employ a process in which a nitrogen-rich layer of a high concentration is formed in the surface of a work in the carbonitriding process and thereafter the diffusing process is performed. At this time, the diffusing process can be performed to set the nitrogen concentration in the vicinity of the surface to 0.7 mass % or less to thereby suppress formation of an incompletely quenched structure. As long as the diffusing process is performed so that the nitrogen concentration in the surface layer portion of the whole part is 0.7 mass % or less, it is suppressed that an incompletely quenched structure remains in the resultant product, specifically in a region (recessed portion for example) which is not to be processed in a later step.

Example 3

Figure 18:
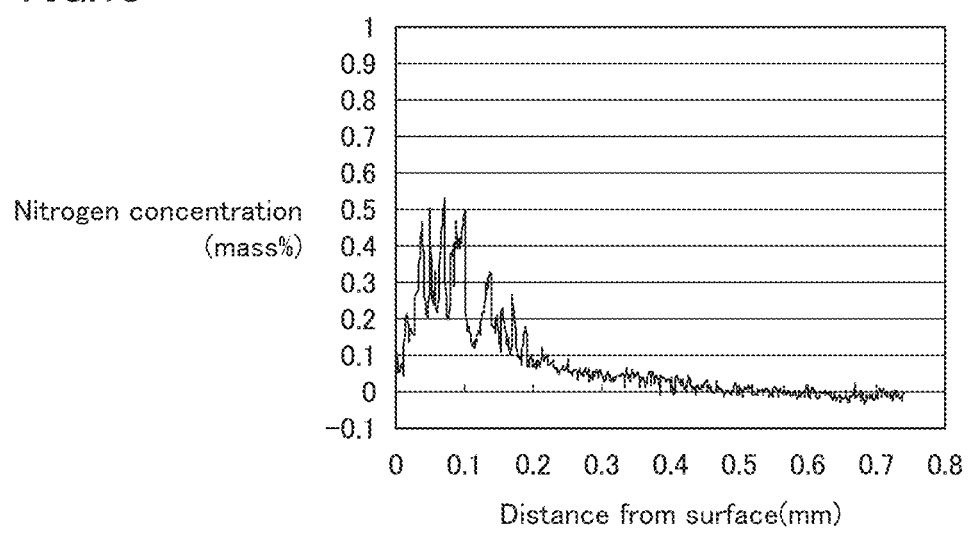
FIG. 18 is a diagram showing a nitrogen concentration in the vicinity of a surface in the case where α is 0.
Figure 19:
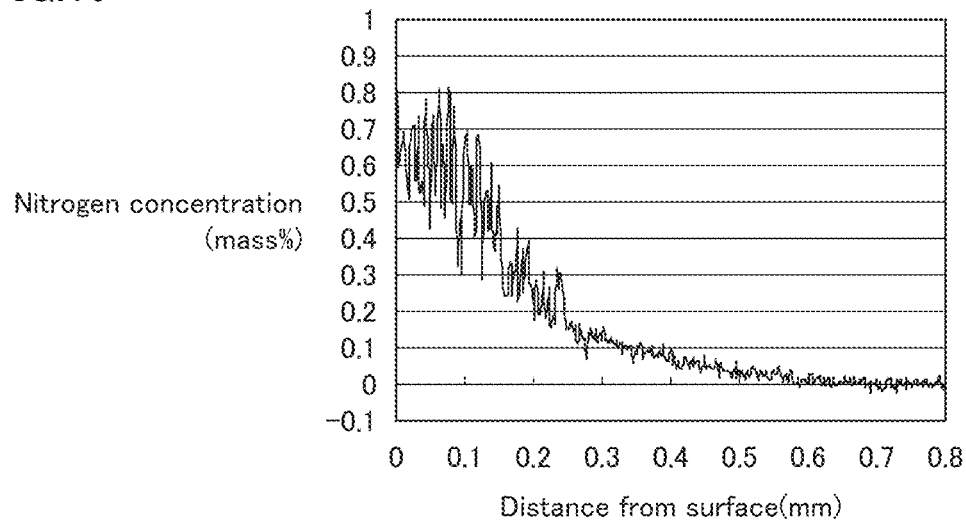
FIG. 19 is a diagram showing a nitrogen concentration in the vicinity of a surface in the case where α is 0.005.

An experiment was conducted for confirming the necessity of atmosphere management in the diffusing process. Specifically, the experiment was conducted in which the carbonitriding process was performed on a specimen made of SUJ2, thereafter the diffusing process was performed with the value of α changed, and the influence of the value of α on the nitrogen concentration in the surface layer region was examined. FIG. 18 shows a nitrogen concentration distribution in the vicinity of the surface in the case where α is 0, and FIG. 19 shows the same in the case where α is 0.005.

As shown in FIG. 18, it is seen that in the case where the diffusing process is performed in the atmosphere where α is 0, namely $P_N$ is 0, nitrogen separates from the surface to cause the nitrogen concentration in the surface layer region to decrease. In contrast, it is seen that in the case where the value of α is 0.005, separation of nitrogen is suppressed and thus the surface layer region having an appropriate nitrogen concentration is obtained. It is seen from this that management of the value of α is also important for the diffusing process. According to the study by the inventors of the present invention, the value of α set to a range of 0.003 to 0.012 enables the surface layer region having an appropriate nitrogen concentration to be obtained.

In the diffusing process after the carbonitriding process, commonly only the carbon potential is adjusted without introducing ammonia in the atmosphere. According to the study by the inventors of the present invention, however, such a diffusing process causes the nitrogen concentration in the surface layer region to decrease and accordingly hinders improvement in durability of a bearing part. Then, in the diffusing process, the value of α is set to a range of 0.003 to 0.012 to thereby improve the durability of the bearing part.

Example 4

Figure 20:
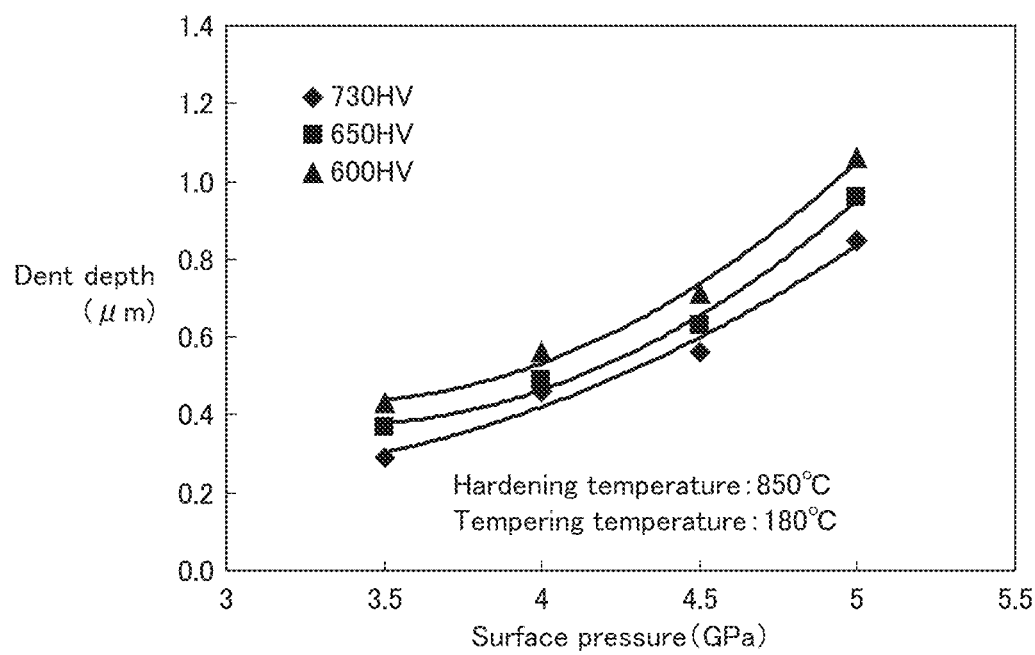
FIG. 20 is a diagram showing a relationship between a surface hardness and a dent depth.
Figure 21:
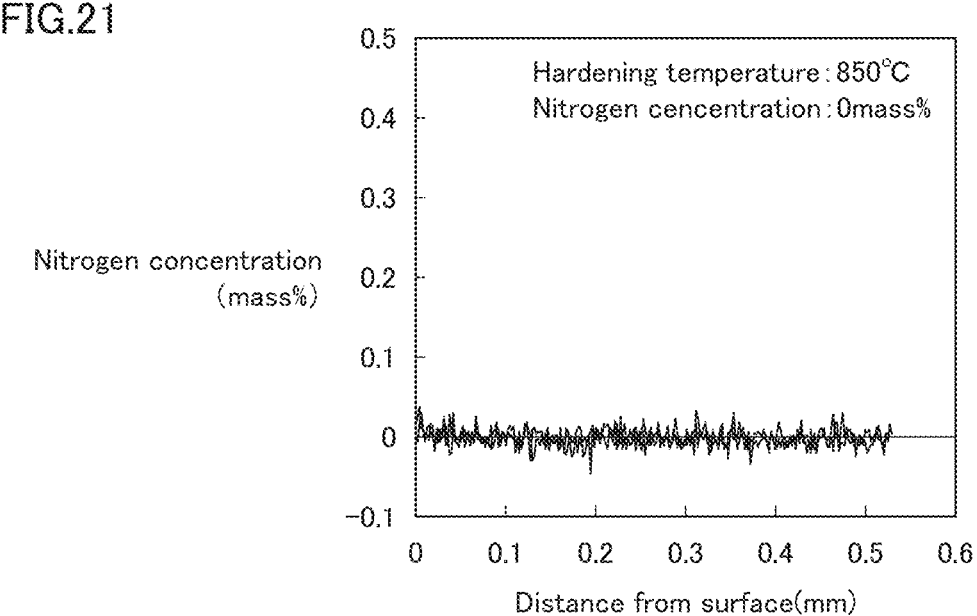
FIG. 21 is a diagram showing a nitrogen concentration distribution directly under a raceway surface.
Figure 22:
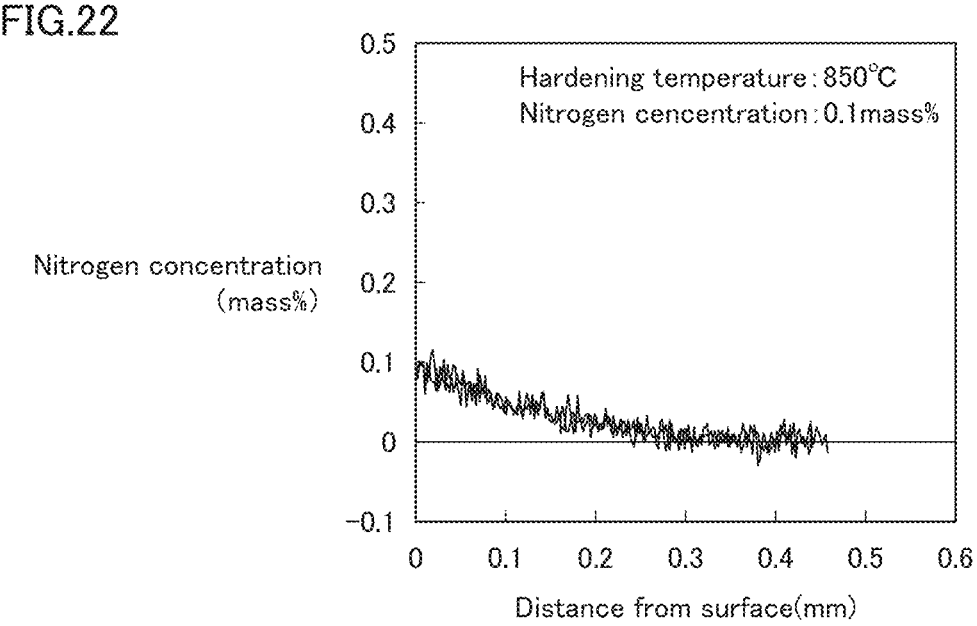
FIG. 22 is a diagram showing a nitrogen concentration distribution directly under a raceway surface.
Figure 23:
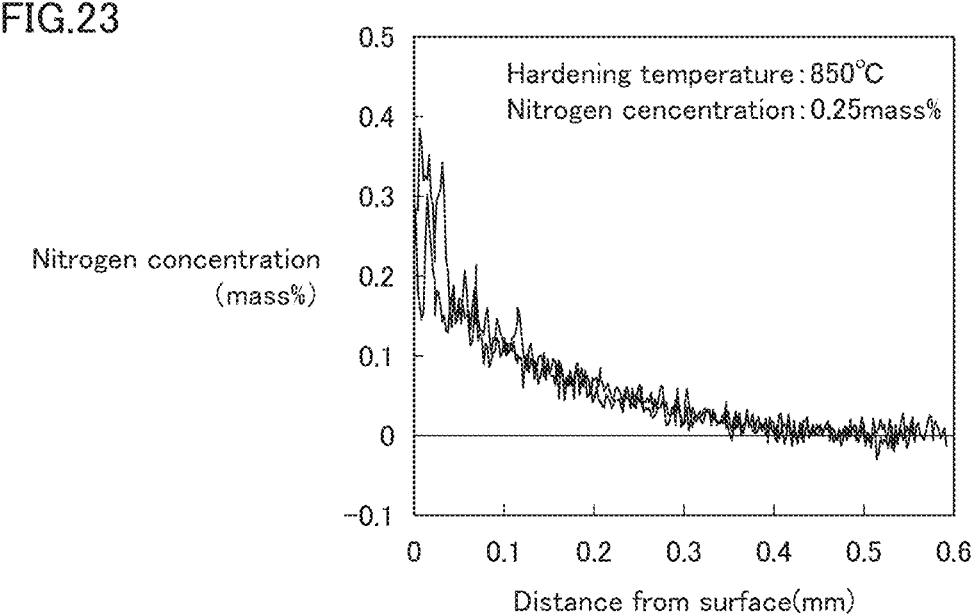
FIG. 23 is a diagram showing a nitrogen concentration distribution directly under a raceway surface.
Figure 24:
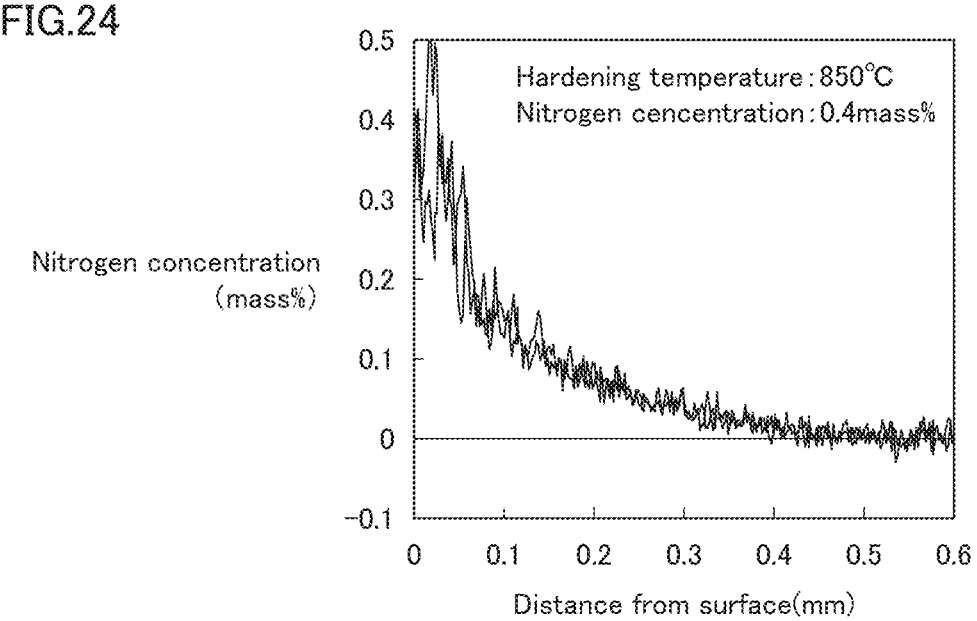
FIG. 24 is a diagram showing a nitrogen concentration distribution directly under a raceway surface.
Figure 25:
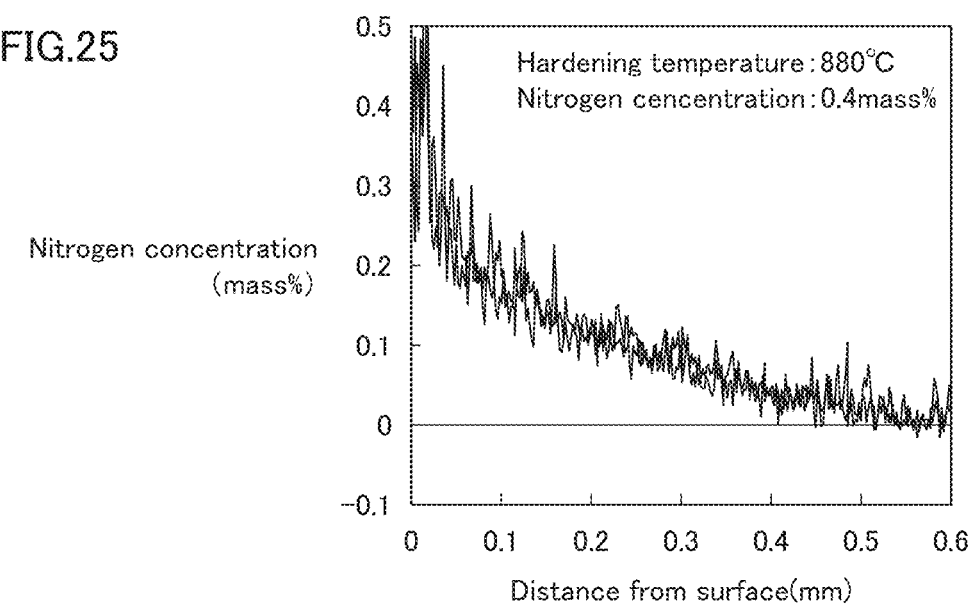
FIG. 25 is a diagram showing a nitrogen concentration distribution directly under a raceway surface.

An experiment was conducted for examining the relationship between the surface hardness and the static load capacity. Specifically, specimens each made of SUJ2 were prepared and subjected to the carbonitriding process, the diffusing process, and the quenching process under the same conditions, and thereafter the tempering temperature was changed. Accordingly samples different in surface hardness from each other were produced. The surface hardness of each sample was measured, and a ball made of silicon nitride with a diameter φ of 9.525 mm was pressed with a certain load against the surface of the sample, to thereby form a dent. Then the depth of the formed dent (the dent remaining after the load is removed) was examined. The results of the experiment are shown in FIG. 20. In FIG. 20, the horizontal axis represents the stress exerted on the surface and the vertical axis represents the depth of the dent.

Referring to FIG. 20, a lower surface hardness is accompanied by a deeper depth of the dent. Only in the case where the surface hardness is 730 HV which is a hardness of 700 HV or more, the range of the dent depth is allowable even in a case where the bearing part is used for an application where a high static load capacity is required. In view of this, the hardness of the contact surface of the bearing part is preferably 700 HV or more.

Example 5

An experiment was conducted for examining an influence of the nitrogen concentration in the surface layer portion on the durability of a race of a rolling bearing. Specifically, a rolling fatigue life test was done with dents formed in a raceway surface of the race (inner ring). A procedure of the experiment is as follows.

The test was performed on a deep-groove ball bearing of model number 6206 defined by the JIS standards (having an inner diameter of 30 mm, an outer diameter of 62 mm, a width of 16 mm, and nine rolling elements, and made of SUJ2). First, through a similar procedure to the above-described embodiments, an inner ring was produced. At this time, the partial pressure of undecomposed ammonia, the partial pressure of hydrogen, and the activity of carbon in the atmosphere in the carbonitriding process, the time for heat treatment, the hardening temperature, and the like were adjusted to thereby control the concentration distribution of nitrogen introduced in the vicinity of the surface of the inner ring. For the sake of comparison, an inner ring on which the carbonitriding was not performed was also produced. Consequently, inner rings having five different nitrogen concentration distributions in FIGS. 21 to 25 were obtained. As to FIGS. 21 to 25 each, the horizontal axis represents the distance from the surface (raceway surface), and the vertical axis represents the nitrogen concentration. The nitrogen concentration distribution was measured twice per condition, and FIGS. 21 to 25 each show the results of two measurements superimposed on each other.

Next, a dent was formed in the obtained inner ring. Here, as a method of evaluating the rolling bearing life in a simulation of an actual usage environment, a life test under a condition of foreign-matters intrusion lubrication may be performed.

Figure 26:
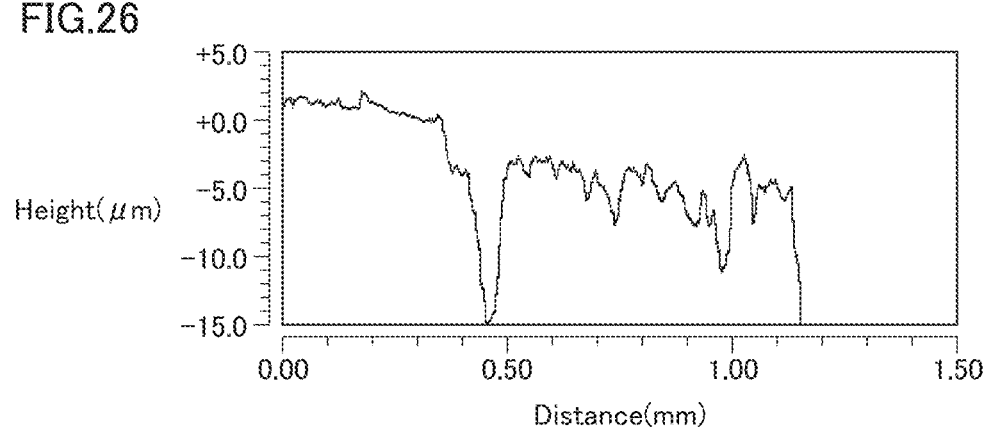
FIG. 26 is a diagram showing a shape in the vicinity of a peeling portion after peeling occurs.

According to this test method, a rolling bearing is operated in a condition where particles (having a hardness of approximately 800 HV) with a particle size of 100 to 180 μm produced through gas atomization are introduced in a lubricating oil for the rolling bearing, and the failure life is evaluated. The reason why the particle size is set to 100 to 180 μm is that a hard foreign matter having a particle size of up to approximately 100 μm may intrude in an actual usage environment. Under such a condition of lubrication where foreign matters intrude, a hard foreign matter forms a dent in the bearing part and peeling originates from this dent, namely a dent-originated peeling occurs. FIG. 26 shows a surface shape (dent shape) of a race failed in a life test under a condition of foreign-matters intrusion lubrication. In FIG. 26, the horizontal axis represents a distance from a reference point along the surface (raceway surface), and the vertical axis represents the height. The portion from the reference point of the horizontal axis to a distance of approximately 0.3 mm is the original raceway surface, the portion from 0.3 mm to approximately 1.1 mm is the dent, and the region of 1.1 mm or more corresponds to a peeled portion. It is seen from FIG. 26 that a dent formed by the hard foreign matter has a depth of approximately 15 to 20 μm.

The shape of a protruded portion of the dent and the microstructure of the dent are critical factors determining the life. The shape of the protruded portion of the dent is considered as being determined by the microstructure of the material extending to the dent depth. Further, depending on the nitrogen concentration, the microstructure of the steel varies. In view of the above, the life in an environment in which hard foreign matters intrude is considered as being affected not only by the nitrogen concentration in the surface but also by the nitrogen concentration from the surface to the dent depth.

As described above, the dent depth is up to about 20 μm. Accordingly, the region from the surface to a depth of 20 μm is herein defined as a surface layer region (surface layer portion) and the average nitrogen concentration in the surface layer region (surface layer portion) is noted. The average nitrogen concentration in this surface layer region can be examined specifically by conducting a linear analysis by means of EPMA (Electron Probe Micro Analysis) in the depth direction in a cross section perpendicular to the surface and calculating the average in a region from the surface to a depth of 20 μm.

Figure 27:
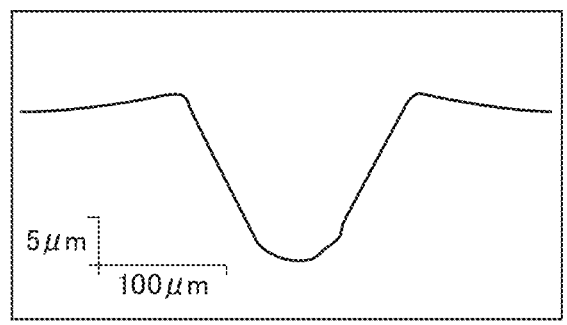
FIG. 27 is a diagram showing an example shape of a dent.

In view of the results of the foregoing study, a Rockwell hardness measurement indenter of conical diamond (an indenter having a spherical surface with a curvature of 0.2 mm on the apex of a cone having a vertical angle of 120°) was pressed with a load of 196 N against a central portion of the groove bottom of the raceway surface of an inner ring, to thereby form a dent. The shape of the formed dent was measured with a three-dimensional surface shape device. It was confirmed that the shape of the protruded portion around the perimeter of the dent was substantially symmetrical in the axial direction and the circumferential direction, with respect to the axis of symmetry defined as the center of the dent. FIG. 27 shows a typical dent shape. 30 dents were made in one inner ring that were formed at regular intervals (every center angle of 12°) in the circumferential direction.

Figure 28:
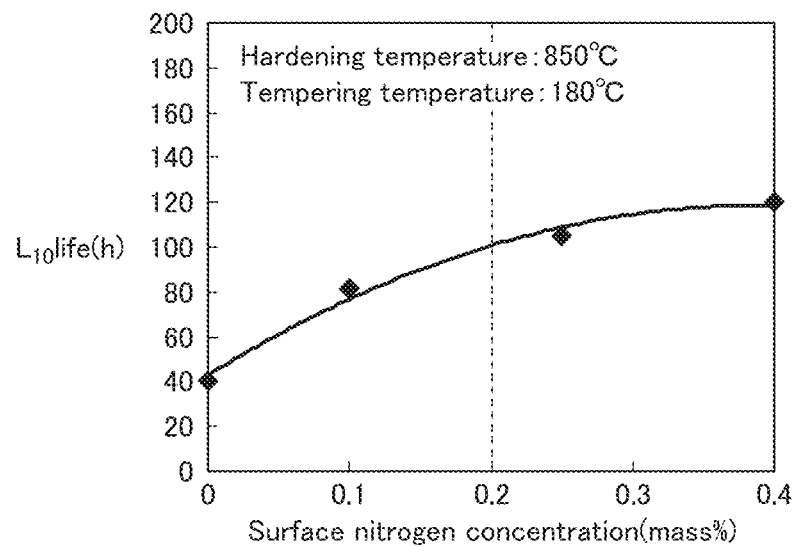
FIG. 28 is a diagram showing a relationship between an average nitrogen concentration in a surface layer region and a dent-originated peeling life.

The inner ring thus produced was combined with a normal outer ring on which the carbonitriding process was not performed and no dents were formed, as well as rolling elements and a cage for example, and they were assembled into a bearing. The resultant bearing was subjected to a life test. The results of the test are shown in FIG. 28. A bearing was also formed through a similar procedure in which dents were not formed, and the life in a normal detergent oil lubrication environment was examined. The results of the life test in the detergent oil lubrication environment are shown in FIG. 29.

Figure 29:
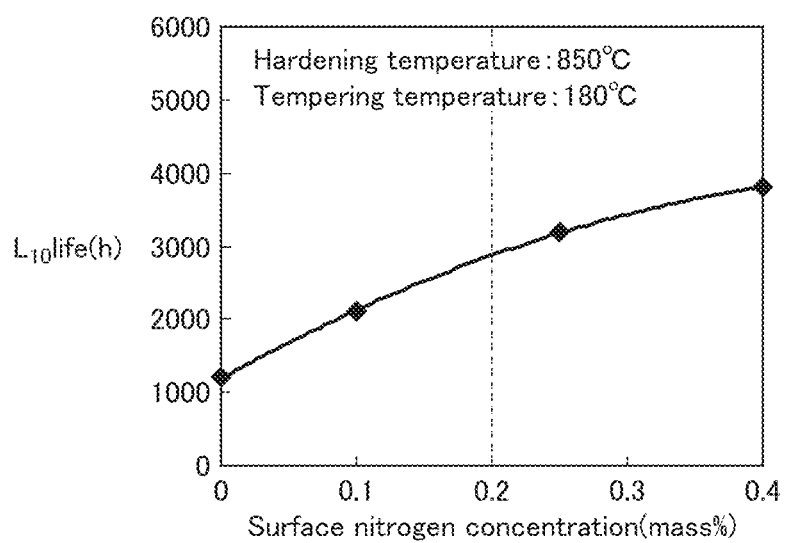
FIG. 29 is a diagram showing a relationship between an average nitrogen concentration in a surface layer region and a detergent-oil lubrication life.

In FIGS. 28 and 29 each, the horizontal axis represents the average nitrogen concentration in the surface layer region, and the vertical axis represents the time ($L_{10}$ life) where the accumulated failure probability is 10%. Referring to FIG. 28, in the case where the average nitrogen concentration in the surface layer region is 0.2 mass % or more, the dent-originated peeling life is at least twice as long as that in the case where the average nitrogen concentration is 0. Referring to FIG. 29, in the case where the average nitrogen concentration in the surface layer region is 0.2 mass % or more, the life in the detergent oil lubrication environment is also at least twice as long as that in the case where the average nitrogen concentration is 0.

It has been confirmed from the above-described results of the experiment that in order to achieve distinguishing effects of formation of a nitrogen-rich layer (carbonitriding process), the average nitrogen concentration in the surface layer region should be 0.2 mass % or more. From the results of the experiment explained in connection with Example 2, it is seen that in order to suppress formation of an incompletely quenched structure, the average nitrogen concentration in the surface layer region should be 0.7 mass % or less. In view of this, an appropriate surface nitrogen concentration should be 0.2 mass % or more and 0.7 mass % or less.

Example 6

Figure 30:
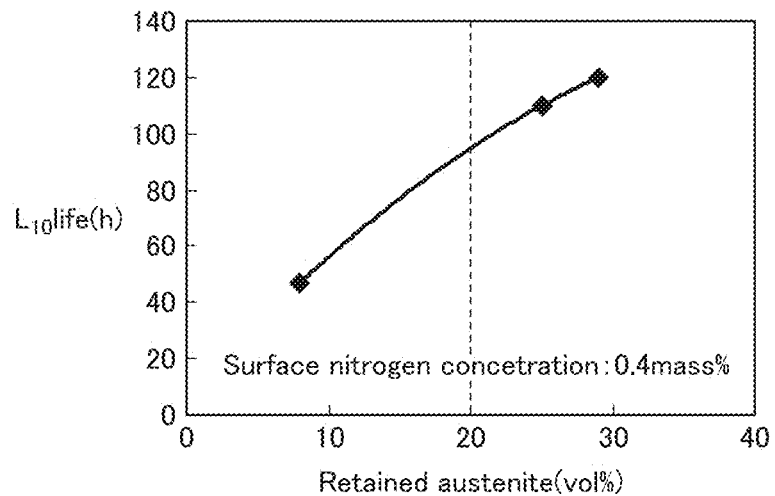
FIG. 30 is a diagram showing a relationship between an amount of retained austenite and a dent-originated peeling life.

An experiment was conducted for examining the relationship between the amount of retained austenite in the contact surface and the dent-originated peeling life. Specifically, samples were produced for which the average nitrogen concentration in the surface layer region was set constant (0.4 mass %) and the tempering temperature was varied so that the amount of retained austenite was varied, and the dent-originated peeling life test explained in connection with Example 5 was conducted. The results of the experiment are shown in FIG. 30. In FIG. 30, the horizontal axis represents the amount of retained austenite in the raceway surface of an inner ring, and the vertical axis represents the $L_{10}$ life.

Referring to FIG. 30, a greater amount of retained austenite is accompanied by a longer dent-originated peeling life. In the case where the amount of retained austenite is 20 vol % or more, the dent-originated peeling life is at least twice as long as that in the case where the average nitrogen concentration is 0 in the above-described Example 5. In contrast, if the amount of retained austenite is more than 35 vol %, the hardness of the raceway surface (contact surface) may be inadequate. It is seen from the foregoing results of the study that the amount of retained austenite in the contact surface is preferably 20 vol % or more and 35 vol % or less.

Example 7

Figure 31:
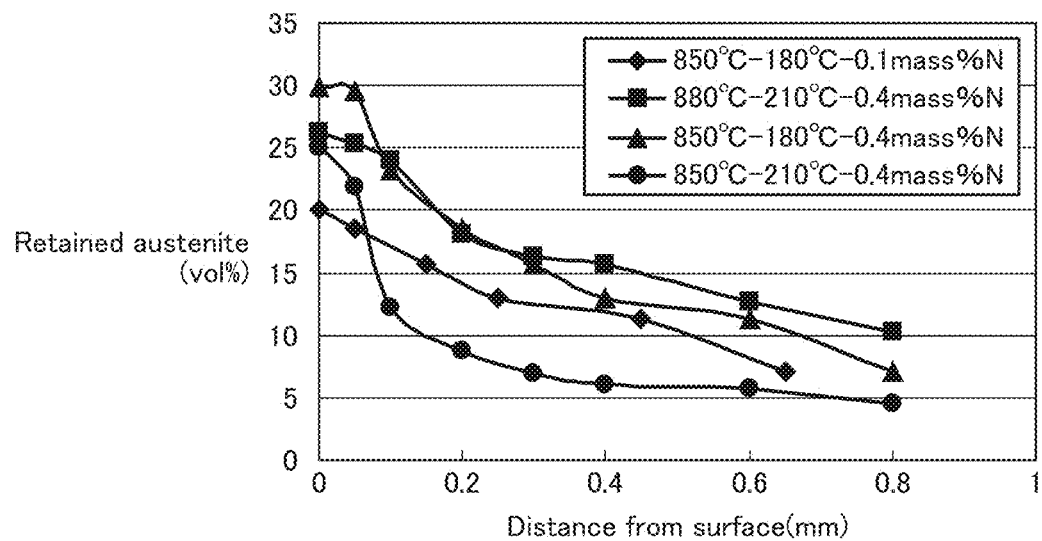
FIG. 31 is a diagram showing a distribution of an amount of retained austenite in the vicinity of a surface.

An experiment was conducted for examining the relationship between the amount of retained austenite in the whole part and the dimensional stability. Specifically, a ring-shaped specimen made of SUJ2 and having an outer diameter φ of 60 mm, an inner diameter φ of 54 mm, and a length t in the axial direction of 15 mm was prepared. A heat treatment such as carbonitriding process was performed under different conditions to produce quench-hardened samples different from each other in terms of the average amount of retained austenite in the whole. A distribution of the amount of retained austenite of the samples is shown in FIG. 31. In FIG. 31, the horizontal axis represents the distance from the surface, and the vertical axis represents the amount of retained austenite. Based on FIG. 31, the average amount of retained austenite in the whole sample was calculated. In the legend in FIG. 31, "hardening temperature—tempering temperature—average nitrogen concentration in the surface layer region" is indicated. For example, the indication 850° C.-180° C.-0.4 mass % N means that the hardening temperature is 850° C., the tempering temperature is 180° C., and the average nitrogen concentration in the surface layer region is 0.4 mass %.

Figure 32:
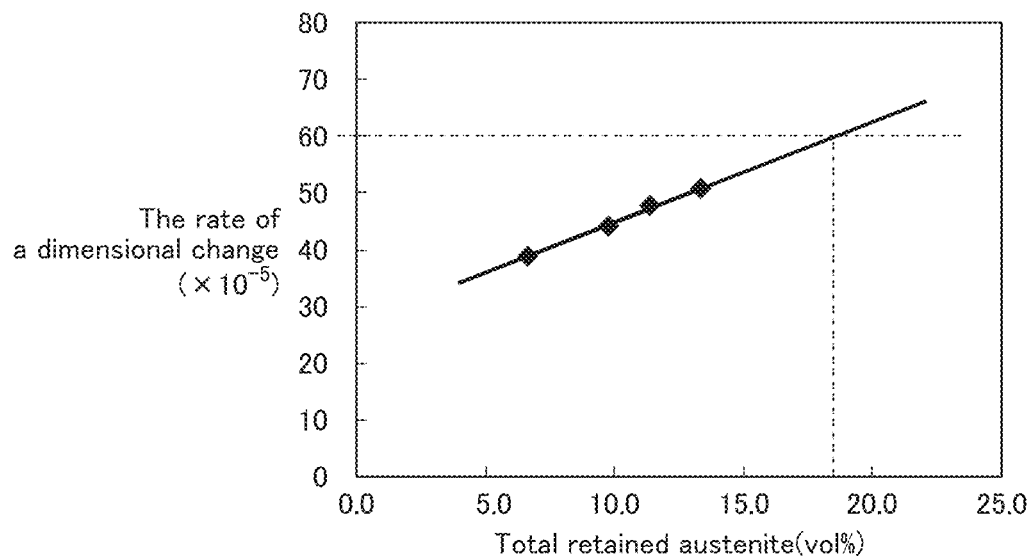
FIG. 32 is a diagram showing a relationship between an amount of retained austenite and a rate of dimensional change.

A process of keeping these samples at 120° C. for 2500 hours was performed. Before and after this process, the outer diameter of each sample was measured, and the dimensional stability was evaluated based on the rate of change of the outer diameter (a value determined by dividing the amount of change by the original outer diameter before changed). Here, the process of keeping the sample at 120° C. for 2500 hours is done for accelerating a secular dimensional change which occurs to an actual part through a long period of time. The results of the test are shown in Table 1. FIG. 32 shows a relationship between the average amount of retained austenite and the rate of dimensional change. In FIG. 32, the horizontal axis represents the average amount of retained austenite in the whole sample, and the vertical axis represents the rate of dimensional change of the outer diameter.

TABLE 1

| | heat treatment | | | |
|---|---|---|---|---|
| steel type | hardening temperature (° C.) | tempering temperature (° C.) | surface nitrogen concentration (mass %) | rate of secular dimensional change (×10⁻⁵) |
| SUJ2 | 850 | 180 | 0.0 | 35.8 |
| | 850 | 180 | 0.1 | 44.1 |
| | 850 | 180 | 0.4 | 47.7 |

TABLE 1-continued

| | heat treatment | | | |
|---|---|---|---|---|
| steel type | hardening temperature (° C.) | tempering temperature (° C.) | surface nitrogen concentration (mass %) | rate of secular dimensional change (×10⁻⁵) |
| | 850 | 210 | 0.4 | 38.9 |
| | 880 | 210 | 0.4 | 50.7 |

Referring to Table 1 and FIG. 32, in order to have a rate of secular dimensional change of $60 \times 10^{-5}$ or less which is a preferred value, the average amount of retained austenite in the whole part is preferably 18 mass % or less.

Example 8

As described above in connection with Example 5, in order to give an adequate durability to a bearing part, the average nitrogen concentration in the surface layer region needs to be 0.2 mass % or more. Here, the nitrogen concentration can be confirmed for example by mean of EPMA as described above. The quality verification by means of EPMA in the mass production process of bearing parts, however, complicates the act of quality verification. It is therefore desired to conduct the quality verification in the mass production process by a simpler and more convenient method. In view of this, the inventors of the present invention have studied a method of conducting the quality verification by means of the fact that nitrogen introduced in the steel improves the tempering softening resistance.

Figure 33:
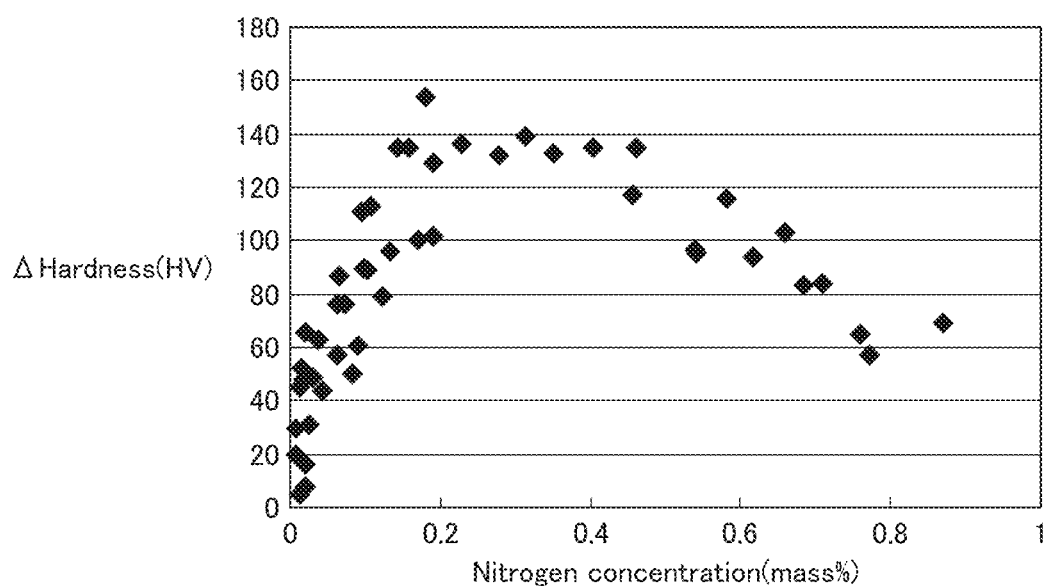
FIG. 33 is a diagram showing a relationship between a hardness difference and a nitrogen concentration after a bearing part is kept at 500° C. for an hour and thereafter cooled.

Specifically, quench-hardened samples (having already undergone the carbonitriding process) different from each other in nitrogen concentration were prepared. An experiment was conducted in which a heat treatment was done in which the samples were kept at 500° C. for an hour and a hardness distribution in a cross section of the heat-treated samples was measured. Here, nitrogen is not introduced into a central portion of the sample and the central portion has the lowest tempering softening resistance. The central portion therefore has the lowest hardness. In contrast, the surface layer portion in which nitrogen is introduced has a tempering softening resistance depending on the nitrogen concentration. The surface layer portion therefore has a higher hardness than the central portion and has a hardness determined depending on the nitrogen concentration. FIG. 33 shows a relationship between the nitrogen concentration and the hardness difference. In FIG. 33, the horizontal axis represents the nitrogen concentration, and the vertical axis represents a difference between a maximum value and a minimum value in the hardness distribution in the cross section.

Referring to FIG. 33, the largest hardness difference after the heat treatment is reached in the case where the nitrogen concentration is approximately 0.2 to 0.3 mass %. In the case where the nitrogen concentration is in a range of 0.2 mass % or more and 0.3 mass % or less, the hardness difference is 130 HV or more with a probability of 95% or more. Therefore, in the case where the hardness distribution is measured in the depth direction in a cross section perpendicular to the surface after the sample is kept at 500° C. for an hour, it can be determined, from the fact that a difference between a maximum value and a minimum value of the hardness is 130 HV or more, that the nitrogen concentration is 0.2 mass % or more. This manner of determination can be used to simply and conveniently conduct the quality verification of a bearing part.

Example 9

Figure 34:
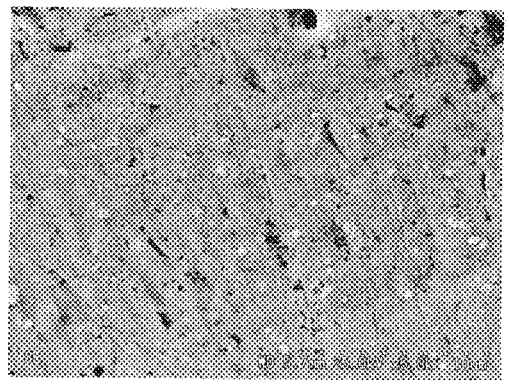
FIG. 34 is an SEM photograph showing a state where carbides have disappeared.
Figure 35:
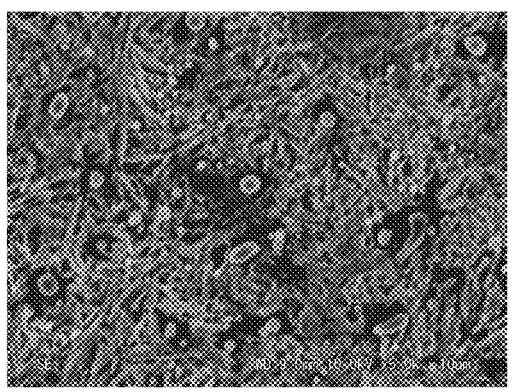
FIG. 35 is an SEM photograph showing a state where carbides are held.

As to a bearing steel containing Cr such as SUJ2 defined by the JIS standards, nitrogen introduced through a carbonitriding process or the like into the steel causes the Cr concentration in the base material to be decreased and causes an austenite single-phase region to expand, and thus the solid solubility limit concentration of carbon increases. Accordingly, if a carbonitriding process of a high concentration (to form a nitrogen-rich layer in which nitrogen is 0.2 mass % or more for example) is performed without particularly taking measures, carbides (including carbonitrides) decrease or disappear even if decarburization does not occur. Here, in order to increase the strength of a bearing part, it is considered preferable to allow carbides to remain and use the precipitation strengthening capability of the carbides. Regarding the method of manufacturing a bearing part in the present embodiment, disappearance of carbides is suppressed by setting the value of $a_c^*$ to 0.88 or more and 1.27 or less and performing carburization prior to the increase of the solid solubility limit of carbon in the nitrogen-rich layer. An experiment was conducted for confirming the effect of remaining carbides. FIG. 34 is an SEM photograph of a cross section of a sample made of SUJ2 and having undergone a carbonitriding process according to the conventional carbonitriding method. In the photograph of FIG. 34, carbides have substantially disappeared. In contrast, FIG. 35 is an SEM photograph of a cross section of a sample made of SUJ2 and having undergone a carbonitriding process according to a carbonitriding method (the value of $a_c^*$ is 1) employed for the method of manufacturing a bearing part in the present embodiment. In the photograph of FIG. 35, five or more carbides with a diameter of 0.5 µm or less are present per 100 µm².

Figure 36:
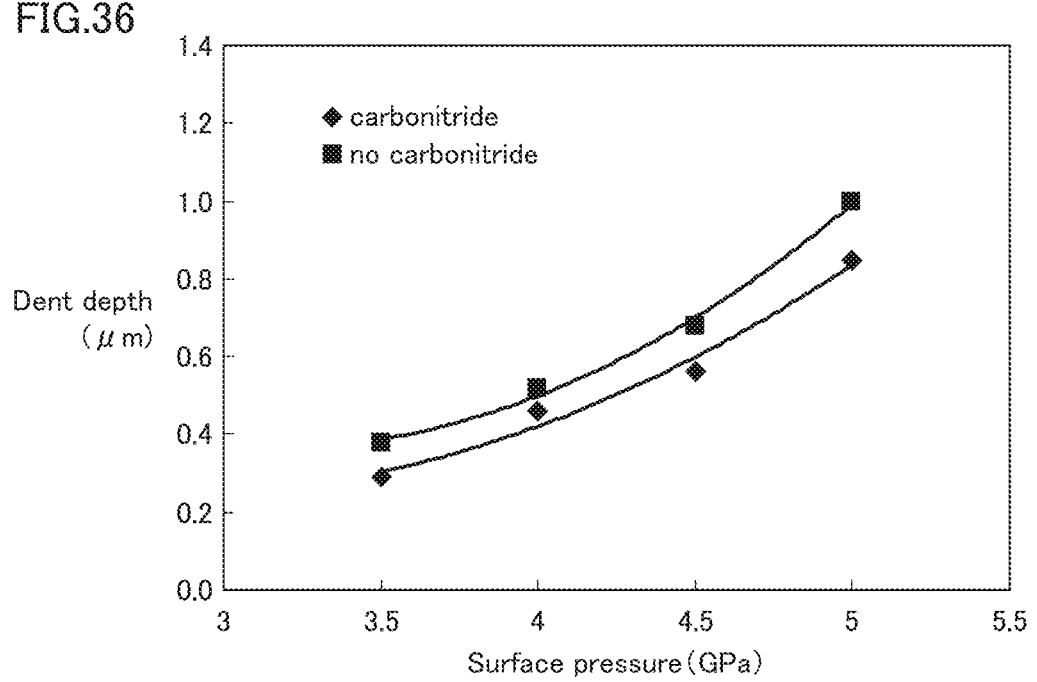
FIG. 36 is a diagram showing an influence of the presence of carbides on the dent depth.

In order to confirm the above-described effect of the carbide, specimens made of SUJ2 were subjected to carbonitriding processes under different conditions, and samples in which the amount (number density) of carbides was varied and the hardness was 750 HV were produced. An experiment was conducted in which a ball made of silicon nitride having a diameter φ of 9.525 mm was pressed against the surface of the sample to form a dent, and the depth of the dent was measured. The results of the experiment are shown in FIG. 36. In FIG. 36, the horizontal axis represents the pressure with which the ball of silicon nitride is pressed, and the vertical axis represents the depth of a dent formed by the pressed ball. In FIG. 36, the square mark represents a sample in which carbides have disappeared, and the rhombus mark represents a sample in which five or more carbides with a diameter of 0.5 µm or less are present per 100 µm².

Referring to FIG. 36, it is confirmed that a sample in which five or more carbides (carbonitrides) with a diameter of 0.5 µm or less are present per 100 µm² has a smaller dent depth relative to a sample in which carbides have disappeared, regardless of the fact that these samples have the same hardness. From the above-described results of the experiment, in order to improve the static load capacity of a bearing part, it is preferable that five or more carbides (carbonitrides) with a diameter of 0.5 µm or less are present per 100 µm² in the surface layer region of the bearing part.

Example 10

Next, the relationship between an area ratio of internal carbides and a foreign-matters intrusion lubrication life was examined. A bearing steel can be solid-solution-strengthened by dissolution of carbides. The area ratio of carbides in the bearing steel before quenched is constant, and therefore, the amount of solid-dissolved carbides can be estimated from the area ratio of internal carbides after the carbonitriding process. Here, regardless of the fact that it is the quality of the surface after being ground that influences the life of the bearing, the amount of solid-dissolved carbon in the base is estimated from the area ratio of internal carbides. This is for the reason that the carbonitriding process causes the surface to be nitrided and thereby increases the solid solubility limit concentration of carbon, and therefore it is difficult to estimate the amount of solid-dissolved carbides in the base. Table 2 shows a relationship between heat treatment conditions and the area ratio (%) of internal precipitates (carbides).

TABLE 2

| heat treatment conditions | area ratio of internal precipitates (%) |
|---|---|
| 800° C. - 180° C. - 0.1 mass % N | 12.0 |
| 850° C. - 180° C. - 0.4 mass % N | 8.3 |
| 880° C. - 210° C. - 0.4 mass % N | 5.0 |

The heat treatment conditions in Table 2 are indicated as "hardening temperature—tempering temperature—nitrogen concentration in the outermost surface after ground." For example, the indication 800° C.-180° C.-0.1 mass % N means that the hardening temperature is 800° C., the tempering temperature is 180° C., and the nitrogen concentration in the surface layer portion is 0.1 mass %. It has been confirmed from Table 2 that a higher heating temperature causes a smaller area ratio of internal precipitates. Namely, increase of the process temperature in the carbonitriding process causes the solid solubility limit concentration of carbon in the base to increase, and thus the amount of solid-dissolved carbon increases and the amount of precipitates decreases. In the case where precipitates are present in a state where the solid solubility limit concentration of carbon has increased, the carbon concentration in the base has reached the solid solubility limit concentration and the carbon concentration in the base of the surface is also increased.

Figure 37:
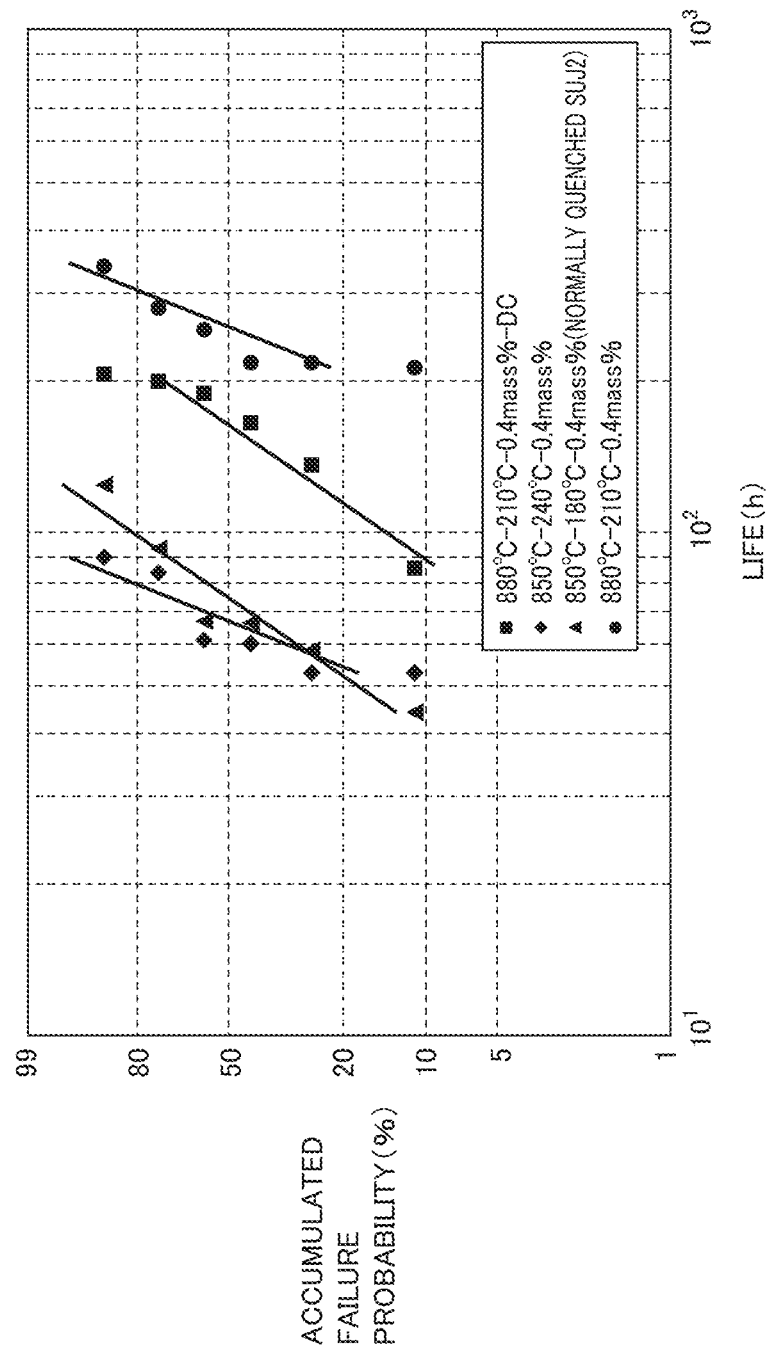
FIG. 37 is a Weibull plot of a foreign-matters intrusion lubrication life.

FIG. 37 shows the results of a test for the foreign-matters intrusion lubrication life (the test method is the one described above). In FIG. 37, the horizontal axis represents the life (h) (the time from the start of the test to occurrence of peeling), and the vertical axis represents the accumulated failure probability (%). In the legend in FIG. 37, "hardening temperature—tempering temperature—nitrogen concentration in the outermost surface after ground" is indicated similarly to Table 2. As shown in FIG. 37, in the case where the area ratio of internal precipitates is small (880° C.-210° C.-0.4 mass %), the life is longer than the life in the case where decarburization is done (880° C.-210° C.-0.4 mass % DC), the life in the case where high-temperature tempering is done (850° C.-240° C.-0.4 mass %), and the life in the case where an SUJ2 material is normally quenched (850° C.-180° C.-0.4 mass % (normally quenched SUJ2)). In the case where high-temperature tempering is done, the decrease of the carbon concentration in the base and the decrease of the retained austenite cause the life to shorten. In the case where decarburization is done, the decrease of the carbon concentration in the base causes the life to shorten.

It should be construed that the embodiments and examples disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The bearing part, the rolling bearing, and the method of manufacturing a bearing part of the present invention are advantageously applicable particularly to a bearing part, a rolling bearing, and a method of manufacturing a rolling bearing that are required to ensure a high durability even in a harsh usage environment.

REFERENCE SIGNS LIST 1 deep-groove ball bearing; 2 thrust needle roller bearing; 4 tapered roller bearing; 11, 41 outer ring; 11A, 41A outer ring raceway surface; 11B, 12B, 13B, 21B, 23B surface layer region; 11C, 12C, 13C, 21C, 23C inner portion; 11D, 12D, 13D, 21D, 23D nitrogen-rich layer; 12, 42 inner ring; 12A, 42A inner ring raceway surface; 13 ball; 13A ball rolling surface; 14, 24, 44 cage; 21 race; 21A raceway surface; 23 needle roller; 23A rolling contact surface; 43A rolling surface; 43 roller; 50 atmosphere control step; 51 undecomposed $NH_3$ partial pressure control step; 52 $H_2$ partial pressure control step; 53 $CO/CO_2$ partial pressure control step; 60 heating pattern control step

The invention claimed is:
1. A bearing part made of a steel containing 0.95 mass % or more and 1.10 mass % or less of carbon, 0.05 mass % or more and less than 0.3 mass % of silicon, 0.10 mass % or more and 0.50 mass % or less of manganese, and 1.30 mass % or more and 2.00 mass % or less of chromium, with the rest made up of iron and an impurity, wherein
a surface layer region defined as a region extending to a depth of not more than 20 μm from a contact surface where the bearing part is in rolling contact with another part has an average nitrogen concentration of 0.2 mass % or more and 0.7 mass % or less, and
five or more carbides with a diameter of 0.5 μm or less are present per 100 μm² in said surface layer region.
2. The bearing part according to claim 1, wherein the average nitrogen concentration is 0.7 mass % or less across the whole region extending to a depth of not more than 20 μm from a surface.
3. The bearing part according to claim 1, wherein said contact surface has a hardness of 700 HV or more.
4. The bearing part according to claim 1, wherein said contact surface has retained austenite of an amount of 20 vol % or more and 35 vol % or less.
5. The bearing part according to claim 1, wherein an average amount of retained austenite in the whole bearing part is 18 vol % or less.
6. The bearing part according to claim 1, wherein a difference between a maximum value and a minimum value of a hardness of the bearing part is 130 HV or more, which is determined from a hardness distribution measured in a depth direction in a cross section perpendicular to said contact surface, after the bearing part is kept at 500° C. for an hour.

7. The bearing part according to claim 1, wherein
a carbonitrided layer is formed in said surface layer region, and
an area ratio of a precipitate in a region where said carbonitrided layer is not formed is 7% or less.
8. The bearing part according to claim 1, wherein a precipitate is present in a surface other than said contact surface.
9. The bearing part according to claim 1, wherein said surface layer region is nitrided by undergoing a carbonitriding process performed so that $a_c^*$ defined by a formula (1) is 0.88 or more and 1.27 or less and a defined by a formula (2) is 0.012 or more and 0.020 or less:

$$a_c^* = \frac{(P_{CO})^2}{K \times P_{CO_2}} \quad (1)$$

where
Pco: a partial pressure (atm) of carbon monoxide,
$P_{CO_2}$: a partial pressure (atm) of carbon dioxide, and
K: <C>+$CO_2$⇔ equilibrium constant of 2CO, $$\alpha = \frac{P_N}{0.006 \times (P_H)^{\frac{3}{2}}} \times \frac{(1.877 - 1.055 \times a_c^*)}{100} \quad (2)$$

where $P_N$ is a partial pressure of undecomposed ammonia and $P_H$ is a partial pressure of hydrogen.
10. The bearing part according to claim 1, wherein
said surface layer region is nitrided by undergoing a carbonitriding process performed at a temperature of 820° C. or more and 900° C. or less, and
after said carbonitriding process, a tempering process is performed at a temperature of 170° C. or more and 220° C. or less.
11. A rolling bearing comprising:
a race member; and
a rolling element arranged in contact with said race member, wherein
at least one of said race member and said rolling element is the bearing part recited in claim 1.
12. A method of manufacturing a bearing part comprising the steps of:
preparing a formed body made of a steel containing 0.95 mass % or more and 1.10 mass % or less of carbon, 0.05 mass % or more and less than 0.3 mass % of silicon, 0.10 mass % or more and 0.50 mass % or less of manganese, and 1.30 mass % or more and 2.00 mass % or less of chromium, with the rest made up of iron and an impurity;
carbonitriding said formed body by heating said formed body to a carbonitriding temperature in a carbonitriding atmosphere containing ammonia, carbon monoxide, carbon dioxide, and hydrogen; and
diffusing nitrogen in said formed body by keeping said carbonitrided formed body at a diffusing temperature equal to or lower than said carbonitriding temperature, in a diffusing atmosphere containing ammonia, carbon monoxide, carbon dioxide, and hydrogen, wherein
said carbonitriding atmosphere has $a_c^*$ set to 0.88 or more and 1.27 or less and a set to 0.012 or more and 0.020 or less and said diffusing atmosphere has $a_c^*$ set to 0.88 or more and 1.27 or less and α set to 0.003 or more and 0.012 or less, said $a_c^*$ and said $\alpha$ are defined respectively by a formula (1) and a formula (2):

$$a_c^* = \frac{(P_{co})^2}{K \times P_{co_2}} \quad (1)$$

where
$P_{co}$: a partial pressure (atm) of carbon monoxide,
$P_{co_2}$: a partial pressure (atm) of carbon dioxide, and
K: $<C>+CO_2 \Leftrightarrow$ equilibrium constant of 2CO, $$\alpha = \frac{P_N}{0.006 \times (P_H)^{\frac{3}{2}}} \times \frac{(1.877 - 1.055 \times a_c^*)}{100} \quad (2)$$

where $P_N$ is a partial pressure of undecomposed ammonia and $P_H$ is a partial pressure of hydrogen, and
a total time for said step of carbonitriding and said step of diffusing is five hours or more and 15 hours or less,
wherein, after the carbonitriding step, the diffusing step is performed with the value of the $\alpha$ changed.

13. The method of manufacturing a bearing part according to claim 12, further comprising the step of performing a tempering process of heating said formed body to a temperature range of 170° C. or more and 220° C. or less and cooling said formed body, after said step of diffusing nitrogen in said formed body.

* * * * *